(12) United States Patent
Chechik et al.

(10) Patent No.: US 12,375,523 B2
(45) Date of Patent: Jul. 29, 2025

(54) DETECTING PHISHING ATTACKS

(71) Applicant: WalkMe Ltd., Tel Aviv (IL)

(72) Inventors: Daniel Chechik, Holon (IL); Nir Nahum, Tel Aviv (IL)

(73) Assignee: WalkMe Ltd., Tel Aviv (IL)

( * ) Notice: Subject to any disclaimer, the term of this patent is extended or adjusted under 35 U.S.C. 154(b) by 557 days.

(21) Appl. No.: 17/579,066

(22) Filed: Jan. 19, 2022

(65) Prior Publication Data

US 2023/0231878 A1     Jul. 20, 2023

(51) Int. Cl.
    *H04L 9/40*     (2022.01)

(52) U.S. Cl.
    CPC .................. *H04L 63/1483* (2013.01)

(58) Field of Classification Search
None
See application file for complete search history.

(56) References Cited

U.S. PATENT DOCUMENTS

| | | | | |
|---|---|---|---|---|
| 8,695,100 | B1 * | 4/2014 | Cosoi | H04L 63/0227 726/22 |
| 2013/0086677 | A1 * | 4/2013 | Ma | H04L 63/1483 726/22 |
| 2014/0359760 | A1 * | 12/2014 | Gupta | H04L 63/1483 726/22 |
| 2017/0126730 | A1 * | 5/2017 | Oberheide | H04L 63/1483 |
| 2018/0027013 | A1 * | 1/2018 | Wright | H04L 61/4511 726/23 |
| 2023/0188563 | A1 * | 6/2023 | Sircar | H04L 63/0236 726/1 |

\* cited by examiner

*Primary Examiner* — Esther B. Henderson
(74) *Attorney, Agent, or Firm* — Myers Wolin, LLC

(57) ABSTRACT

An apparatus, system, product and method comprising: obtaining a selection of page elements of a source page that are estimated to represent a visual appearance of the source page; generating respective representations of the page elements, wherein the representation is configured to be used for acquiring a page element in different pages; obtaining a target page, wherein a user is enabled to interact with the target page; determining a visual similarity measurement between the source page and the target page, wherein the visual similarity measurement is based on a successful acquisition in the target page, of the page elements, using the respective representations; classifying the target page as a phishing attack based on the visual similarity measurement, whereby detecting the phishing attack; and performing a responsive action in response to said detecting the phishing attack.

20 Claims, 8 Drawing Sheets

DETECTING PHISHING ATTACKS

TECHNICAL FIELD

The present disclosure relates to cyber security in general, and to a method, product and apparatus for detecting and protecting against phishing attacks, in particular.

BACKGROUND

Phishing is a type of social engineering where an attacker sends a fraudulent (e.g., spoofed, fake, or otherwise deceptive) message designed to trick a human victim into revealing sensitive information to the attacker or to deploy malicious software on the victim's infrastructure like ransomware. Phishing attacks have become increasingly sophisticated and often transparently mirror the site being targeted, allowing the attacker to observe everything while the victim is navigating the site, and transverse any additional security boundaries with the victim.

As an example of a phishing attack, an attacker may send a fraudulent message to a user, who may be tempted into entering a fraudulent digital asset (e.g., web site, application, or the like) instead of a digital asset the user recognizes and trusts. The user is then requested to provide sensitive data. For example, the user may be requested to provide her credentials, which may then be used by the attacker in the real digital asset. The attacker may also attempt to use the same credentials in other digital assets, as the user may have used the same credentials in different web sites, applications, or the like.

Phishing attacks can cause tremendous damages, both financial and mental, to the victim, such as stealing money, using the victim's funds to make purchases, changing the user's passwords and thus preventing the user from accessing her own accounts, or the like.

BRIEF SUMMARY

One exemplary embodiment of the disclosed subject matter is a method comprising: obtaining a selection of one or more page elements of a source page, wherein the one or more page elements are estimated to represent a visual appearance of the source page; generating one or more respective representations of the one or more page elements, wherein a representation of the one or more respective representations represents a page element of the one or more page elements, wherein the representation is configured to be used for acquiring the page element in different pages; obtaining, at a client device, a target page, wherein the client device is operated by a user and enabling the user to interact with the target page; determining a visual similarity measurement between the source page and the target page, wherein the visual similarity measurement is based on a successful acquisition in the target page, of the one or more page elements, or portion thereof, using the one or more respective representations; classifying the target page as a phishing attack based on the visual similarity measurement, whereby detecting the phishing attack; and performing a responsive action in response to said detecting the phishing attack.

Optionally, the source page is provided in a first language, the target page is provided in a second language, and said determining the visual similarity measurement comprises determining that the visual similarity measurement is above a threshold in spite of the different languages used by the source page and the target page, wherein classifying the target page as the phishing attack is performed based on the visual similarity measurement being above the threshold.

Optionally, the representation is useful for acquiring the page element in the source page and for acquiring a translated page element in the target page, wherein the page element comprises text in the first language, wherein the translated page element comprises a translation of the text in the second language.

Optionally, the source page is part of a sequence of pages in which a user is required to provide information, wherein the sequence of pages comprise the source page and a subsequent source page; wherein the method further comprises: obtaining a subsequent target page, wherein the subsequent target page is navigated to by the client device from the target page; determining a second similarity measurement between the subsequent target page and the subsequent source page; wherein classifying the target page is further based on the second similarity measurement.

Optionally, the similarity measurement is below a threshold indicative of a phishing attack, and the second similarity measurement is below the threshold indicative of a phishing attack, whereby each of the target page and the subsequent target page appearing as legitimate pages independently, whereby a combination of the target page and the subsequent target page is classified as the phishing attack.

Optionally, the selection is obtained from a human operator, using an operator device, wherein the operator device rendering the source page to be displayed to the human operator and enabling the human operator to provide the selection.

Optionally, obtaining the selection comprises: obtaining multiple selections by human operators of elements, wherein each human operator providing a selection of a respective set of elements; and automatically determining the one or more page elements based on the multiple selections.

Optionally, the representation comprises multiple alternative representations of the page element, wherein each alternative representation of the page element indicates a respective attribute of the page element, wherein each alternative representation is configured to independently enable acquisition of the page element, whereby providing a robust acquisition method that does not rely on a single representation.

Optionally, determining the visual similarity measurement comprises: successfully acquiring a first element of the one or more page elements; and failing to acquire a second element of the one or more page elements; wherein the visual similarity measurement is determined based on a partial matching of elements of the source page to the elements of the target page, wherein the visual similarity measurement is above a threshold indicative of a phishing attack.

Optionally, classifying the target page as the phishing attack is performed based on an analysis of a certificate of a domain name of the target page, wherein the analysis determines whether the certificate matches a domain name of the source page, whether the certificate is issued by a trusted certification authority, whether the certificate matches a predefined list of certificates, or the like.

Optionally, the target page is classified based on a similarity measurement of a domain name of the target page to a domain name of the source page being above a first threshold and below a second threshold.

Optionally, the second threshold is indicative of identical domain names.

Optionally, determining the visual similarity measurement is performed subject to the target page comprising a user input field.

Optionally, the user input field comprises a user name input field, a password input field, an account number input field, a credit card number input field, a telephone number input field, an e-mail address input field, or the like.

Optionally, the responsive action comprise at least one action selected from a group consisting of: displaying a warning to a user browsing the target page; blocking the user from using the target page; preventing the user from interacting with an input field of the rendered page; redirecting the user from the target page; and issuing an alert to an organization to which the user belongs.

Optionally, the representation of the page element comprises a contextual property that is based on a property of another element in the source page and a relative property between the page element and the another element.

Another exemplary embodiment of the disclosed subject matter is an apparatus comprising a processor and coupled memory, said processor being adapted to: obtain a selection of one or more page elements of a source page, wherein the one or more page elements are estimated to represent a visual appearance of the source page; generate one or more respective representations of the one or more page elements, wherein a representation of the one or more respective representations represents a page element of the one or more page elements, wherein the representation is configured to be used for acquiring the page element in different pages; obtain, at a client device, a target page, wherein the client device is operated by a user and enabling the user to interact with the target page; determine a visual similarity measurement between the source page and the target page, wherein the visual similarity measurement is based on a successful acquisition in the target page, of the one or more page elements, or portion thereof, using the one or more respective representations; classify the target page as a phishing attack based on the visual similarity measurement, whereby detecting the phishing attack; and perform a responsive action in response to said detecting the phishing attack.

Yet another exemplary embodiment of the disclosed subject matter is a computer program product comprising a non-transitory computer readable medium retaining program instructions, which program instructions when read by a processor, cause the processor to: obtain a selection of one or more page elements of a source page, wherein the one or more page elements are estimated to represent a visual appearance of the source page; generate one or more respective representations of the one or more page elements, wherein a representation of the one or more respective representations represents a page element of the one or more page elements, wherein the representation is configured to be used for acquiring the page element in different pages; obtain, at a client device, a target page, wherein the client device is operated by a user and enabling the user to interact with the target page; determine a visual similarity measurement between the source page and the target page, wherein the visual similarity measurement is based on a successful acquisition in the target page, of the one or more page elements, or portion thereof, using the one or more respective representations; classify the target page as a phishing attack based on the visual similarity measurement, whereby detecting the phishing attack; and perform a responsive action in response to said detecting the phishing attack.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
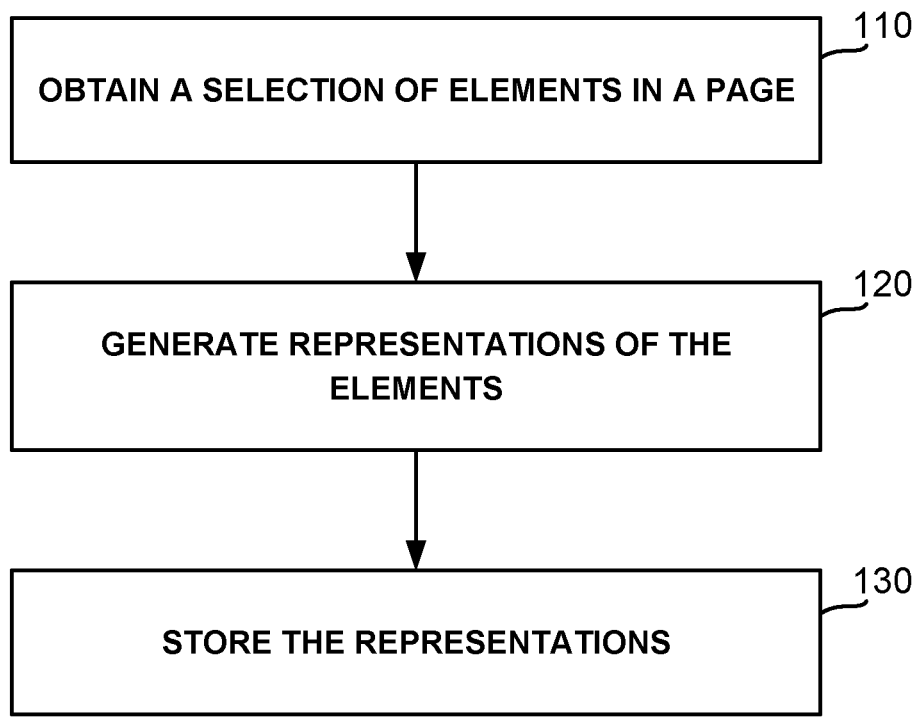
FIG. 1 shows a flowchart diagram of a method, in accordance with some exemplary embodiments of the disclosed subject matter.

One technical problem dealt with by the disclosed subject matter is the universal need of preventing social engineering attacks such as phishing attacks. Phishing is one of the major cyber problems that lead to financial losses for both industries and individuals. During a phishing attack, an adversary may masquerade as a trusted entity in order to steal user data, e.g., login credentials and credit card numbers, or in order to deploy malicious software on the victim's infrastructure. In the case of spear phishing attacks, the adversary may target a specific business or organization by sending tailored phishing emails or other messages, which may tempt the user into entering a fraudulent digital assets, such as websites and mobile applications. In some cases, the adversary may target a specific business or organization by creating an imitation webpage imitating a legitimate webpage and duping the user into opening an email, instant message, text message, popup window, or the like, and selecting a malicious link therein that leads to the fraudulent imitation webpage. The fraudulent website may then request the user to provide sensitive information such as her credentials to be used by the attacker in real websites. The adversary may use the obtained credentials or sensitive information to access the original website, to access other digital assets, to perform transactions on the expense of the user, or the like. Detection of phishing attacks with high accuracy may be challenging to protect users from phishing attacks.

It is noted that in the present disclosure, the terms "phishing", "phishing attack", "phishing attempt" or similar terms are used interchangeably and are intended to cover any action in which an attacker fraudulently tempts a victim to provide credentials, install malware, or innocently and unknowingly perform any other action that may harm the user or another person or organization by using a digital asset that appears, to a human user, similar to a genuine digital asset.

Naïve countermeasures may include taking security measures such as identification of the user by an additional means such as out-of-band authentication, corresponding legislation against phishing, providing user training against phishing, creating public awareness of phishing, or the like.

However, none of these measures, neither their combination, provide satisfactory results in preventing phishing attacks.

Another technical problem dealt with by the disclosed subject matter is providing early detection of phishing attacks in order to reduce their damage. It may be desired to detect phishing attacks before the credentials of the user are provided or utilized, to detect phishing attacks before malware is installed, such as by issuing an alert indicating that the webpage is a fraudulent webpage, in order to prevent or mitigate the impact of the phishing incidents.

Yet another technical problem dealt with by the disclosed subject matter is ensuring that a detection of phishing pages does not flag legitimate pages as phishing pages. In some cases, such as in spear phishing attacks, phishing pages may have similar or even identical appearance as the respective legitimate page, which may increase a probability of confusion between the pages. In some cases, users may be more likely to fall for phishing attacks that have a similar appearance to a legitimate webpage with respect to phishing attacks that have a non-similar appearance with differences that can be easily perceived by a human eye.

Yet another technical problem dealt with by the disclosed subject matter is enabling to identify that elements of a rendered page (also referred to as a 'target page') correspond to those of a legitimate page (also referred to as a 'source page') even in case they underwent small changes such as slight location changes in the page, text changes such as translations of the text, or the like. It may be desired to identify corresponding elements of pages, so as to reduce a probability of filtering out phishing pages with corresponding elements without alerting the user. For example, an adversary may create an imitation page that imitates a legitimate page, e.g., GMAIL™ login page, except having some differences in some elements. While the user may be tricked by the fabricated GMAIL™ login page, a naive computerized solution may fail to detect the phishing attack in view of the supposedly major differences between the two pages, which may not appear to be major to a human being. As another example, the use of a translated version of an existing page may appear completely different to a naive computerized solution, while a human understanding both languages, may not even perceive that there's any difference if the look and feel of the webpage is maintained.

It is noted that for clarity of disclosure, the example of phishing websites is used extensively. However, the disclosed subject matter is not limited to such digital assets, and is applicable to all forms of page-based digital assets, such as native mobile applications, web-based applications, desktop programs, or the like.

One technical solution provided by the disclosed subject matter comprises identifying a sequence of one or more phishing pages (referred to as "phishing pages") that imitate one or more respective pages of a legitimate digital asset (referred to as "legitimate pages" or "source pages"), based on a stored representations of elements of the legitimate pages. In some exemplary embodiments, a target page that is rendered by a browser may be analyzed for phishing attacks in case the target page is estimated to include sensitive data, in case input fields are identified in the page, in case a type of sensitive process such as a login process is identified in the page, in case the user reached the page by following a link, or the like. In some exemplary embodiments, the page may be analyzed by a program executed by a computing platform (e.g., client device) of the user (referred to as the 'agent'), such as a plug-in of the web browser, an extension to the web browser, a dedicated web browser, a desktop program, or the like. In some exemplary embodiments, the agent may determine whether stored representations of elements in a legitimate source page correspond to characteristics of the target page. In some exemplary embodiments, in case of a match is identified, the target page may be determined to potentially constitute a phishing attack. Additionally or alternatively, in case of domain-based digital assets, a domain name of the target page may be compared with the domain name of the source page. In case the domain names are not identical, a phishing attack may be detected. Additionally or alternatively, high similarity in the domain names may be indicative of a phishing attack. However, identity or highly similar Uniform Resource Locators (URLs) and domain names may be indicative of a non-phishing attack (e.g., in case of a different sub-domain; different page within the legitimate domain; different domain owned by the same entity; or the like).

In some exemplary embodiments, phishing pages may attempt to manipulate a user to believe that they are accessing a page of a legitimate digital asset that the user trusts, with which the user shares sensitive information, or the like, in order to obtain sensitive data from the user. In some exemplary embodiments, legitimate pages (also referred to as 'source pages') may comprise original pages of an organization that do not imitate or fake an identity of another organization. In some exemplary embodiments, legitimate pages may comprise pages for which protection may be sought, e.g., by an owner of the digital asset, by an operator of the digital asset, by users of the digital asset, or the like. In some exemplary embodiments, an adversary may create phishing digital assets such as websites by copying one or more features of a legitimate website, creating a website with a misleading appearance, or the like. In some exemplary embodiments, an adversary may provide a link to a phishing page via an instant message, a text message, a social media message, an email, or the like, and attempt to obtain sensitive data of the user, such as credentials, credit card numbers, or the like, at the landing page associated to the link, a subsequent page, or the like. Alternatively, the adversary may attempt to manipulate or persuade users to visit a phishing page in any other way.

In some exemplary embodiments, in order to identify that a rendered sequence of one or more target pages imitates a sequence of one or more legitimate source pages, one or more portions of each legitimate page may be recorded. In some exemplary embodiments, a user such as an operator of a website, an operator of an anti-phishing organization, or any other human user, automation program, or the like, may select for each legitimate page that is desired to be protected, a plurality of elements that are estimated to visually represent the page. In some exemplary embodiments, elements may be selected in case they are estimated to provide a substantial visual effect, in case they enable to recognize or identify the page, in case they are highly perceivable, in case they are unique, or the like. For example, in case of a log in process that utilizes a sequence of two legitimate pages, the log in process may be protected by recording representing elements of both pages, and recording the order between the pages, recording user interactions with the first page that caused the rendering browser to navigate to the second page, or the like. In some exemplary embodiments, the selection may be performed via a user interface of a recording application, via a user interface of a recording website, via an executable command, via a vocal command, or the like.

In some exemplary embodiments, during the recording process, each selected element in a loaded legitimate page may be recorded by generating a representation of the element, and retaining the representation in a database of legitimate websites ('legitimate database'). In some exemplary embodiments, the legitimate database may comprise a repository, database, data center, or the like. In some exemplary embodiments, the legitimate database may be retained at a server, locally at a browsing device, at a browser extension, at a browser plugin, or the like. In some exemplary embodiments, each represented element of a legitimate page in the legitimate database may be retained in association with the page in which the element was recorded, acquired, represented, or the like. In some exemplary embodiments, each page in the legitimate database may be retained in association with a domain name or URL, such as a domain name of a website including the page, a URL of the page itself, or the like. The domain names or URL may be retained externally from the legitimate database, or internally therein. In case the domain names or URLs are retained within the legitimate database, they may be retained in separate records from the elements and page records, or in association therewith, such as within the page records. In some exemplary embodiments, a representation of an element may comprise one or more corresponding Document Object Model (DOM) elements, metadata, contextual properties of the element, attributes of the element, or the like. In some exemplary embodiments, a DOM-based representation of an element may be generated to comprise an element type, a parent or child element, a node, a root, a branch, a text of the element, a combination thereof, or the like. In some exemplary embodiments, a contextual or display-based representation of an element may comprise contextual attributes such as an element's location in the display, neighboring elements, or the like. In some exemplary embodiments, an element may be represented by one or more DOM-based representations, one or more contextual representations, a combination thereof, or the like. In some exemplary embodiments, one or more representations of an element may comprise executable queries that can be executed over a rendered page, non-executable data records, non-executable metadata, or the like.

In some exemplary embodiments, in addition to recording representations of elements in a legitimate page, ordered processes with multiple pages may be recorded. In some exemplary embodiments, in case of a multi-phase source page sequence in a legitimate website, such as a reset password sequence, a Multi-Factor Authentication (MFA) authentication process, or the like, the sequence may be recorded by recording the state of the legitimate website throughout several source pages, recording elements in the source pages with an associated order, recording functionalities of the sequence such as navigation functionalities between the source pages, or the like. In some exemplary embodiments, each recorded element may be recorded in association with its housing page and the order of the source page within the sequence. In some exemplary embodiments, navigation controls between the sequence of source pages may be recorded as well, indicating a defined manner of navigating between the source pages. For example, a login process of a legitimate page may comprise a first source page and a second source page. In some exemplary embodiments, an operator may record important elements in the first source page, a control such as a button that enables to navigate to the second source page, and important elements in the second page.

In some exemplary embodiments, upon rendering, by a user device, a sequence of one or more webpages (referred to as 'rendered pages' or 'target pages'), an analysis may be performed to determine whether the target pages match legitimate source pages of a website. In some exemplary embodiments, the rendered pages may be rendered by and browsed using a browser, an in-app browser, or the like, such as in response to a user selecting a link thereto, or in any other way. In some exemplary embodiments, in case a rendered page is estimated to be sensitive, such as in case the page comprises one or more user input fields, the page is estimated to include or be part of a sensitive process (e.g., login, password reset, transaction process, or the like), the agent may analyze the rendered page for phishing attacks, by comparing one or more features and characteristics of the rendered page to recorded representations of one or more legitimate pages from the legitimate database. In some cases, the analysis may comprise extracting properties of the rendered pages, and comparing them with representations of elements in source pages of the legitimate database. In other cases, the analysis may comprise applying representations of legitimate elements in legitimate source pages over rendered target pages, to determine whether the representations are detected in the target pages. In some exemplary embodiments, in case one or more representations of an element comprise executable queries, the queries may be executed over the rendered page, to detect thereby whether attributes of the element are present in the rendered page, such as by selecting the elements and the navigation control.

In some exemplary embodiments, an element in a target page may be determined to be analogous to a recorded element of a source page in case a comparison between the elements corresponds, matches, or the like, e.g., with a matching score that complies with a threshold. In some cases, the matching score may be a score determined when attempting to acquire the recorded element in the target page using a representation thereof, and acquiring the element in the target page. In some exemplary embodiments, a robustness level or a match between two pages (a source page and a target page) may be adjustable, such as based on a level of similarity that is desired for each recorded element, for each page of a multi-phase sequence, or the like. In some exemplary embodiments, in case of DOM-based representation of elements, two elements may correspond in case they include a same attribute type, text, image, content, or the like. In some exemplary embodiments, in case of contextual representations of an element, two elements may correspond in case they are positioned in a similar or same relative area of the page, have same neighboring elements, or the like.

In some exemplary embodiments, in order for a rendered page to be considered analogous or matching to a legitimate page, the rendered page may not necessarily be required to include of all the recorded elements of the legitimate page. In some exemplary embodiments, in order for a rendered element in a rendered page to be considered analogous or matching to a recorded element, the rendered element may not necessarily be required to comply with all of the representations of the legitimate element, e.g., based on an adjustable similarity threshold, an adjustable robustness threshold, or the like. It will be appreciated that the characteristics of a rendered page may resemble a legitimate page even in case they are similar but not identical. For example, the pages may seem identical to a human eye, but may not withstand a mathematical comparison, for example a size or location of an element may differ in a few pixels, an RGB color may differ in one or few levels, one or more elements of a source page may be missing, or the like. Thus, two representations of an element may be considered equal or matching also if they differ in up to a predetermined threshold. In further embodiments, a degree of similarity may be calculated rather than a binary equal/different test, such that the similarity degree is higher for closer characteristics, and vice versa.

In some exemplary embodiments, the currently disclosed analysis may overcome element updates, translations, or the like, in which matching elements may have slight differences due to different versions of the same page, different languages, or the like. In some exemplary embodiments, an element in a rendered page may be determined to match a recorded element in case a similarity score between the elements complied with a threshold, even in case some differences are detected, e.g., in case a certain number of properties are identical in both pages. In some exemplary embodiments, since the recorded representations of an element may not be required to be fully matched to a corresponding element in a rendered page, the elements may be determined to match in different versions of the page, different languages, or the like.

In some exemplary embodiments, a rendered page may be determined to match or be an imitation of a legitimate page in case a similarity score between at least some representations of the elements of the legitimate page and identified properties of the rendered page overpasses a similarity threshold. In some exemplary embodiments, a rendered page may be determined to match or be an imitation of a legitimate website in case a representation of selected elements of the legitimate page is detected in a rendered page, e.g., with a matching score above a threshold. In some exemplary embodiments, a rendered page may be determined to match or be an imitation of a legitimate website in case recorded DOM elements of the legitimate page are found in the rendered page, such as in an identical or similar version. In some exemplary embodiments, in case the analysis determines that the rendered page and a legitimate page match, this may indicate that the appearance of the rendered page resembles an appearance of the legitimate page.

In some exemplary embodiments, in case of a multi-phase sequence, a first legitimate page of a recorded multi-phase sequence may be matched to a rendered page, and further user interactions may be monitored to identify navigations to subsequent pages. In some exemplary embodiments, each subsequent page that is rendered may be analyzed to compare attributes of its elements to representations of elements in the respective page of the multi-phase sequence. Upon reaching a subsequent rendered page, the subsequent rendered page may be compared to a respective page of the multi-phase sequence, e.g., iteratively. In some cases, for a login process of two pages, elements of a first rendered page may be compared to representations of selected elements in the first login page, the navigation to a next page may be compared to the defined navigations of the login process, and elements of the following page that is rendered may be compared to representations of selected elements in the second login page. In some exemplary embodiments, the similarity between the elements of each page of the multi-phase sequence may be measured and scored, and the pages may be considered to match the multi-phase sequence in case a combined or averaged similarity score of the pages overpasses a multi-phase threshold. In some cases, a threshold for similarity score between two or more pages and the multi-phase sequence may be set to be lower than a threshold of each page independently, since the combination itself may increase a match probability.

In some exemplary embodiments, in case a match is detected between one or more rendered target pages and one or more respective legitimate source pages, indicating that the rendered pages visually resemble the source pages, the rendered pages may be analyzed to verify that they do not include an instance of the legitimate website itself. For example, in case a rendered page resembles a source page of a legitimate website, the user may assume she is consuming the legitimate website, while the rendered page may or may not comprise the legitimate website. In some exemplary embodiments, the domain names of the pages may be compared to each other, e.g., in order to identify whether the rendered pages are in fact legitimate. Alternatively, the domain name of the rendered page may be first compared to domain names of stored legitimate pages, e.g., after the rendered page is determined to comprise a sensitive process, and only in case no match is found for the domain name, the representations of the legitimate pages may be applied to the rendered page to identify a matching legitimate page. Additionally or alternatively, a similarity between the URL or domain name of the rendered page and of the legitimate page may be measured. In case the similarity measurement is between a first threshold (e.g., indicating that the domains are similar enough) and a second threshold (e.g., indicating that the domains are not too similar or identical), a phishing attack may be detected.

In some cases, the comparison between the domain names may be computationally easier to test than the comparison between the element characteristics of the pages, and performing the domain name comparison prior to the representation comparison may enhance performances and avoid delays.

In some exemplary embodiments, each legitimate page may be retained with an associated domain name, such as a URL. In some exemplary embodiments, a domain name of a rendered page, such as a URL of the rendered page, may be compared to a domain name of the corresponding legitimate page, e.g., the URL of the legitimate page. In some exemplary embodiments, in case the domain names are determined to mismatch, such as in case the URLs are not identical, and the page elements are determined to match, the rendered page may be determined to be a phishing page that represents a spear phishing attempt. It will be appreciated that in case of identical domain names, this may indicate that the rendered page is not part of a phishing attempt but rather a rendered legitimate site, resulting with no further checks and no responsive action, while significant similarity but not identity may indicate a high phishing probability.

In some exemplary embodiments, in case the pages' domain names are determined to be different, while the pages may be determined to match, a phishing attack may be detected.

In some cases, a phishing attack may comprise or be combined with one or more additional attack vectors, such as a Domain Name System (DNS) spoofing attack, a Secure Sockets Layer (SSL) certificate fabrication, a combination thereof, or the like. In some cases, when performing DNS spoofing attacks (also referred to as 'DNS cache poisoning'), e.g., as part of a man-in-the-middle attack, an attacker may use altered DNS records to redirect online traffic to a fraudulent website that visually resembles its intended destination. In some cases, the SSL protocol may be configured to prevent DNS spoofing attacks. In some cases, the SSL protocol may comprise a security protocol that creates an encrypted link between a web server serving a target page, and a web browser rendering the target page, as part of the Hypertext Transfer Protocol Secure (HTTPS) protocol. In some cases, an SSL certificate may comprise a digital certificate that authenticates an identity of an owner of a website and enables to generate an encrypted connection. In some cases, an attacker may perform a DNS spoofing attack, and fabricate an SSL certificate, or any other certificate, in order to increase a reliability of the target page and reduce likelihood of the phishing attach being discovered. In such cases, the domain of the target page may seem reliable, or be identical to the domain of a corresponding source page, which may increase a difficulty of identifying the phishing attack. In some exemplary embodiments, during a combined DNS spoofing and SSL certificate faking attack, a target page that is rendered by a user device may include a fraudulent webpage, that appears to be retrieved from the legitimate domain of a source page, with a fake SSL certificate that matches the domain of the legitimate, source page.

In some exemplary embodiments, the disclosed subject matter may address such attack vectors, such as by using the agent to analyze the certificate that is served by the target page, thereby enabling to detect and block the attack. In some exemplary embodiments, the agent may be configured to inspect, analyze, test, or the like, one or more aspects or properties of the certificate that is served by the target page. In some exemplary embodiments, the certificate that is served by the target page may be analyzed on a client-side, such as by the agent executed by a browser extension of a user device, remotely, or the like. In some exemplary embodiments, the agent may be configured to be executed by a browser extension of a browsing device that renders the target page, executed independently of the browser extension, or the like.

In some exemplary embodiments, the certificate that is served by the target page may be analyzed to determine whether the certificate was issued by a trusted certification authority, e.g., an authority that belongs to a determined list of trusted authorities, an authority with a proved identity, or the like. In some exemplary embodiments, in case the certification authority or issuing party is not determined to be trusted, the target page may be classified as a phishing page. In some exemplary embodiments, in case the certification authority is determined to be trusted, or regardless thereof, the certification authority may be compared to the certification authority of the source page, e.g., to ensure they include an identical certification authority. In some exemplary embodiments, the SSL certificate may be analyzed using a pinning mechanism, predefined whitelists, or the like. In some exemplary embodiments, any other mechanism may be used to analyze the SSL certificate.

In some exemplary embodiments, the SSL certificate may be analyzed to prove an identity of a certification authority, e.g., using a pinning mechanism that may specify a cryptographic identity. In some exemplary embodiments, the cryptographic identity may comprise a file that can be used to prove the identity of a server or a host that serves the target page, through one or more cryptography methods. In some exemplary embodiments, in case the identity of the server or host is not proved, not certified, or the like, by the pinning mechanism, the target page may be classified as a phishing attack, e.g., even in case a similarity score of the target page is below a similarity threshold of any source page, even in case a domain of the target page is identical to a domain of a corresponding source page, even in case a certification authority of the target page is identical to a certification authority of the source page, or the like.

In some exemplary embodiments, the SSL certificate may be analyzed using one or more predefined whitelists, e.g., in order to identify whether the certification authority is legitimate. In some exemplary embodiments, the browser extension may be configured to match a hash of the certificate against a predefined list of legitimate hashes, to determine whether the hash is listed therein. In some exemplary embodiments, in case the hash is not listed in the list of legitimate hashes, the target page may be classified as a phishing page, e.g., even in case that the certificate of the target page is determined to be identical to an expected certificate of the corresponding source page. In some exemplary embodiments, since legitimate certificates and legitimate certification authorities may alter over time, the predefined list of legitimate hashes may be configured to be updated periodically. In some exemplary embodiments, unless a trusted authority is hacked and used to issue a new certificate on their behalf, this method may safely differentiate between legitimate pages and phishing pages.

In some exemplary embodiments, the certificate of the target page may be analyzed independently from a similarity analysis, instead of the similarity analysis, or the like. For example, the certificate of the target page may be analyzed prior to performing a similarity analysis, in parallel thereto, after thereto, or the like. In some exemplary embodiments, in case a certificate of a domain of a target page is determined to be fabricated, issued by an untrusted certification authority, or the like, a phishing attack may be detected regardless of the target page's similarity score with respect to a source page. Alternatively, a phishing attack may be detected based on a combination of the certificate analysis and the similarity analysis, e.g., based on a weighting scheme determining a weight of each analysis.

In some exemplary embodiments, in response to detecting a phishing attack, a responsive action may be determined, performed, or the like, e.g., by the agent. In some exemplary embodiments, a responsive action may include preventive measures configured to protect the user from being violated by the phishing attack, alerts, or the like. In some exemplary embodiments, a responsive action may include displaying a warning alert to the user, generating a popup window or notification to the user, sending an alert message to an operator of the respective legitimate website, blocking the user from accessing the rendered page, restricting access to certain fields on the page, preventing the user from inputting data into input fields, redirecting the user to a safe website, generating an event that is sent to a Security Operation Center (SOC), alerting a central security system such as a Security Information and Event Management (SIEM) system, or the like.

In some exemplary embodiments, the action level of the responsive actions may depend on the similarity between stored domain names of legitimate webpages and the domain name of the rendered page. In some cases, a higher similarity between domain names, for example, where the only difference between the URLs is the "gov" or "co" extension instead of a "com" extension, may imply a higher probability that the rendered page is a phishing page, as it may deceive users more effectively than very different domain names. In such cases, a phishing attack may be determined with or without requiring performing a similarity measurement of the pages' contents.

In some exemplary embodiments, in case of a multi-phase sequence, such as a reset password sequence, the domain names of each page may be compared to the domain names of the matching pages. In some exemplary embodiments, in addition to comparing the domain names, navigation or functionality differences between the page sequences may be monitored, to detect one or more differences in functionalities between the rendered pages and the legitimate pages. In some cases, functionality differences may indicate that an adversary is not familiar with the functionality of the legitimate website, and that the rendered pages include phishing pages, with an increased probability. In some cases, functionality differences may constitute version changes of the legitimate website that were not updated and recorded yet. In some cases, the navigation or functionality differences between the pages may not be used to determine a similarity score between the sequences, but rather may be used as indicators of phishing attacks that are separate from the similarity scores. Alternatively, the functionality differences may be used to generate the similarity score between the sequences.

In some exemplary embodiments, a similarity threshold for a sequence of pages may be set to comprise a lower threshold than each individual page. For example, for a single legitimate page, an alert may be defined to be generated when a similarity score of the page and a rendered page is 85% or greater, and their domain names do not match. In a multi-phase scenario with a sequence of legitimate pages that mismatch domain names of corresponding rendered pages, even in case the similarity score between the first page and its imitation is measured below the threshold, e.g., with a score of 70%, and the similarity score between the second page and its imitation is measured below the threshold, e.g., with a score of 75%, the combined similarity score of both imitation pages may nonetheless cause a phishing alert. For example, a combined threshold may be set to be 70% in average for a multi-phase sequence, even if each rendered page separately would not be detected as a phishing page.

In some cases, potential functionality differences may be measured in case the similarity scores of each pair of pages does not comply with the corresponding similarity threshold, in case an averaged similarity score of the sequence does not comply with a corresponding lower threshold, in case a similarity threshold is complied with, in case an averaged similarity score of the sequence nearly complies with a similarity threshold, or in any other scenario. In some cases, functionality differences, if identified, may affect the phishing probability, such as by increasing the phishing probability. In some exemplary embodiments, utilizing functionality differences for adjusting a probability of a phishing attack may rely on the fact that adversaries may not necessarily have access to business logic and functionalities of legitimate pages, even if they may be able to imitate their style, layout, or the like.

One technical effect of the disclosed subject matter is enabling to assess a phishing risk of a rendered page based on representations and domain names of legitimate websites. In some exemplary embodiments, the recording process identifies the main characteristics of each legitimate page, and enables to protect single and multi-phase pages. In some exemplary embodiments, the matching process utilizes the recording process and enables to efficiently identify or acquire essential elements over different rendered pages. Based on the matching process, rendered pages that imitate a legitimate page may be identified, while the more exact imitations may be detected with an increased probability compared to less exact imitations of legitimate pages.

Another technical effect of the disclosed subject matter is solving translation challenges in which a rendered element corresponds to a legitimate page, except for having text in one or more different languages. In this scenario, it may be desired to identify that the elements match, although the text is not identical, since the user may still be deceived from such similarity. In some exemplary embodiments, the currently disclosed element acquisition may identify elements that were updated, translated, or the like, as corresponding to an original element of a legitimate page, since the representations may identify a same element even without all representations being complied with, found, or the like. In some exemplary embodiments, the currently disclosed element acquisition may enable to identify elements of legitimate pages within rendered pages in different versions, languages, or the like, of the page, thereby enabling to decrease maintenance costs of recording elements to the legitimate database, enabling to record legitimate websites in a limited number of languages or versions, or the like.

Yet another technical effect of the disclosed subject matter is enabling to identify and prevent phishing attacks. In some exemplary embodiments, the disclosed subject matter may prevent phishing attacks that attempt to steal credentials, personal information, credit card information, or the like, by identifying an attack and blocking the attack. For example, the disclosed subject matter may prevent a phishing attack that includes asking a user to pay taxes via a fake email from an address that imitates an address of the postal office, leading to a fake postal page asking for credit card information of the user. The disclosed subject matter enables to provide real time alerts to users regarding detected phishing attacks, and to perform real time blocks of browser sessions, loaded pages, or the like.

Yet another technical effect of the disclosed subject matter is enabling to detect phishing attempts in real time when the user is browsing a webpage that was never encountered before, such that a corresponding action can be taken to eliminate or prevent damage to a user or an organization.

Yet another technical effect of the disclosed subject matter is enabling to perform an analysis of rendered pages locally, on the computing platform of the browsing user, such as by a browser or a browser extension. The locality provides for faster and independent analysis that does not require availability or efficiency of a server.

Yet another technical effect of the disclosed subject matter is handling difficult cases of phishing attacks. In some exemplary embodiments, users may be more likely to identify independently a phishing attack in case the phishing page has clear differences in appearance from the original legitimate page, since such cases may be more perceivable, e.g., in relation to phishing page that highly resemble the legitimate page. Users may therefore need more assistance with highly similar phishing attacks. In some exemplary embodiments, the disclosed subject matter enables users to deal with the more difficult cases, where the phishing page has a strong similarity in appearance from the respective legitimate page. The stronger the similarity in appearance of the phishing website and the legitimate page, the disclosed subject matter has higher chances of matching the pages and detecting the phishing attack.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, showing a flowchart diagram of a method, in accordance with some embodiments of the disclosed subject matter.

On Step 110, a selection of one or more page elements (also referred to as 'elements') in a legitimate page may be obtained, as part of a recordation phase. In some exemplary embodiments, the selection may be obtained from a human operator using an operator device. The operator device may render the legitimate page to be displayed to the human operator and may enable the human operator to provide the selection thereto, such as by selecting or clicking on page elements. In some exemplary embodiments, a user, an operator, client-side software agent, or the like, may utilize a recording platform such as a recording application to load thereon a legitimate page and select elements from the legitimate page that are expected to generate the highest likelihood of identifying the page. In some exemplary embodiments, the selection may be performed based on a user estimation that the page elements identify the page, represent a visual layout of the page, represent a visual appearance of the page, or the like. For example, an operator that manages a website may select elements for pages of the website. In some exemplary embodiments, the selection may be performed automatically, such as by an automation process, e.g., based on historic selections of page elements by human operators constituting a training set of a classifier. For example, multiple selections of page elements may be obtained from human operators, and stored in a database. Each human operator may provide, for a respective page, a selection of a set of elements within the page that are estimated to represent the visual aspect of the page. Based thereon, such as based on a classifier that is trained on the historic human selections in the database, page elements may be automatically selected in a new page sample that is not retained in the database. In some exemplary embodiments, the selection may be performed in any other manner, such as automatically using rules or heuristics, by a user who browses the legitimate page through a user device, or the like.

In some exemplary embodiments, the page elements may comprise one or more graphic elements, i.e., elements that have a visual representation on the webpage, that can be perceived by the user. For example, graphic elements may include color properties, size properties, shape properties, location properties, text properties, image properties, or the like. In some exemplary embodiments, the page elements may comprise one or more DOM elements, properties thereof, or the like. In some exemplary embodiments, the page elements may comprise one or more auditory properties, which may or may not be associated to graphical elements in the page. In some exemplary embodiments, the page elements may one or more contextual properties such as one or more neighbor elements that are positioned near an element, a position of the element with respect to the page or the display, a type of the element, or the like. For example, a contextual property of a page element may be based on a property of another element in the page and a relative property between the page element and the another element.

On Step 120, representations of the selected elements may be generated, recorded, or the like, by an agent. In some exemplary embodiments, the software agent may comprise a client-side browser extension, a desktop agent, or any other component that may have access to the selected page elements, to a user interface of a browsing device, to the recording platform, to an Application Programming Interface (API) of the recording platform, or the like. In some cases, the client-side software agent may comprise a Digital Adoption Platform (DAP) software layer, which may be integrated on top of another software application or website. In some exemplary embodiments, the selected elements may be obtained by the software agent for processing.

In some exemplary embodiments, for each selected element, at least one representation may be generated. In some cases, multiple alternative representations may be generated for a single page element, where each alternative representation of the page element indicates a respective attribute, property, element relationship, or the like, of the page element. In such cases, each alternative representation may be configured to independently enable acquisition of a page element, whereby together providing a robust acquisition method that does not rely on a single representation. In some cases, single representations may be generated for each selected page element.

In some exemplary embodiments, a representation of a page element of a page may be configured to be used for acquiring the page element in different pages, e.g., different legitimate or non-legitimate versions of the page. In some cases, an element may be acquired over different pages using one or more acquisition processes such as described by U.S. Pat. No. 10,620,975 filed Jun. 12, 2019, titled "GUI Element Acquisition Using A Plurality Of Alternative Representations Of The GUI Element", and U.S. Pat. No. 10,713,068 filed Nov. 22, 2019, titled "Improving Acquisition Process Of GUI Elements Using User Input", which are hereby incorporated by reference in their entirety without giving rise to disavowment. In some exemplary embodiments, the acquisition processes may not necessarily require all the representations or queries of an element to match each other, in case the matching rate of the queries to an element complies with a threshold, e.g., a dynamically adjustable threshold. In some exemplary embodiments, the acquisition process may solve translation scenarios in which two compared page elements are identical or have multiple similar properties except for having text in different languages, since the majority of queries may select the corresponding element even if a text query does not identify an elements.

In some cases, a representation of a page element may comprise an executable representation that can be executed, e.g., by a browser or agent, over rendered pages, in order to acquire elements in the rendered pages. In some exemplary embodiments, a representation may comprise a respective query that may be executed over a page in order to acquire or determine a presence of attributes of the element within the page. In some exemplary embodiments, a representation of an element may utilize one or more alternative queries to acquire a single element, each query representing an independent alternative representation of the element. In some exemplary embodiments, the element may be acquired, or identified in a page, by applying or executing one or more queries, which identify contextual or other properties of the element, over a page, and determining that the element was found in case at least some of the queries identify a same element in the page.

In some exemplary embodiments, a representation of an element may comprise a DOM-based attribute associated with the page element, a DOM representation of attributes of the page element, or the like. In some exemplary embodiments, a representation of an element may comprise a contextual representation of an element associated to a context of the element within the page, within neighboring elements, or the like. In some exemplary embodiments, a representation of a page element may comprise a contextual property that is based on a property of another element in the page and a relative property between the page element and the another element, such as a distance between the elements.

In some exemplary embodiments, a representation of an element may be generated to comprise a non-executable representation. For example, an element may be represented by one or more indications of attributes, properties, DOM elements, text, images, style, or the like, and the element may be identified in a page by extracting page properties and comparing the indicated properties of the element within the page properties. In some exemplary embodiments, the representation of the element may comprise DOM representations of attributes of the page element.

On Step 130, the representations of the selected elements may be stored, logged, or the like, in a legitimate database that stores data of legitimate pages, websites, or the like. In some exemplary embodiments, each element representations may be stored in association with a legitimate page thereof, in association with a domain name of the page, in association with an order of the page within a multi-phase sequence, or the like. For example, each entry in the database may be related to a webpage and comprises the URL or another identifier of the webpage, representations of selected elements within the webpage, or the like.

In some exemplary embodiments, in case of multi-phase page sequences, representations of elements of the sequence may be stored in association with the respective page, with an order of the pages, or the like. In some exemplary embodiments, in case of multi-phase page sequences, some elements may be shared between more than one page of the sequence, such as in case certain elements may be associated with multiple pages of a domain name, a site, or the like, rather than with a single page. Such elements may include, in some cases, a background color, a pattern, a logo, a background image, audio, or the like. In some cases, representations of such elements may be stored once for the entire sequence, and indicated as associated to the respective sequence of pages. For example, in case a background is identical in two pages of a sequence, the background representations may be stored in a separate record, and the page records may comprise a link to the background representations, thereby saving resources. In some cases, the representations of such elements may be stored in association with a shared domain name. Alternatively, each page record may store individually representations of all of its elements.

In some exemplary embodiments, the legitimate database may be stored locally at a browsing user device, such as at a browser extension, or remotely, such as at a server. For example, an operating device of an operator that is responsible for recording representations of page elements, may be utilized also for uploading the records to a server. In some exemplary embodiments, the legitimate database may comprise one or more databases, repositories, data records, or the like. In some exemplary embodiments, the database or parts thereof may be downloaded to local storages of user devices, such that all further actions may be performed locally, thus enhancing a speed and efficiency of the phishing detection process. Alternatively, the server may utilize the database, and provide phishing indications for uploaded pages. In some exemplary embodiments, the database may be periodically updated, such as by loading for each entry the associated URL, browsing the associated page, and attempting to acquire recorded page elements from the page.

In some cases, the database may be an organizational database comprising representations of elements of sites that people of the organization are known to access frequently or have accessed in the past. In some embodiments, a global database may be created and distributed to multiple clients or organizations, comprising for example the legitimate sites of frequently accessed pages, such as login pages of major banks, home pages of major news sites, or the like. In some cases, the database may be associated to any other category, population, or the like, may be publicly available, privately available, or the like.

Figure 2:
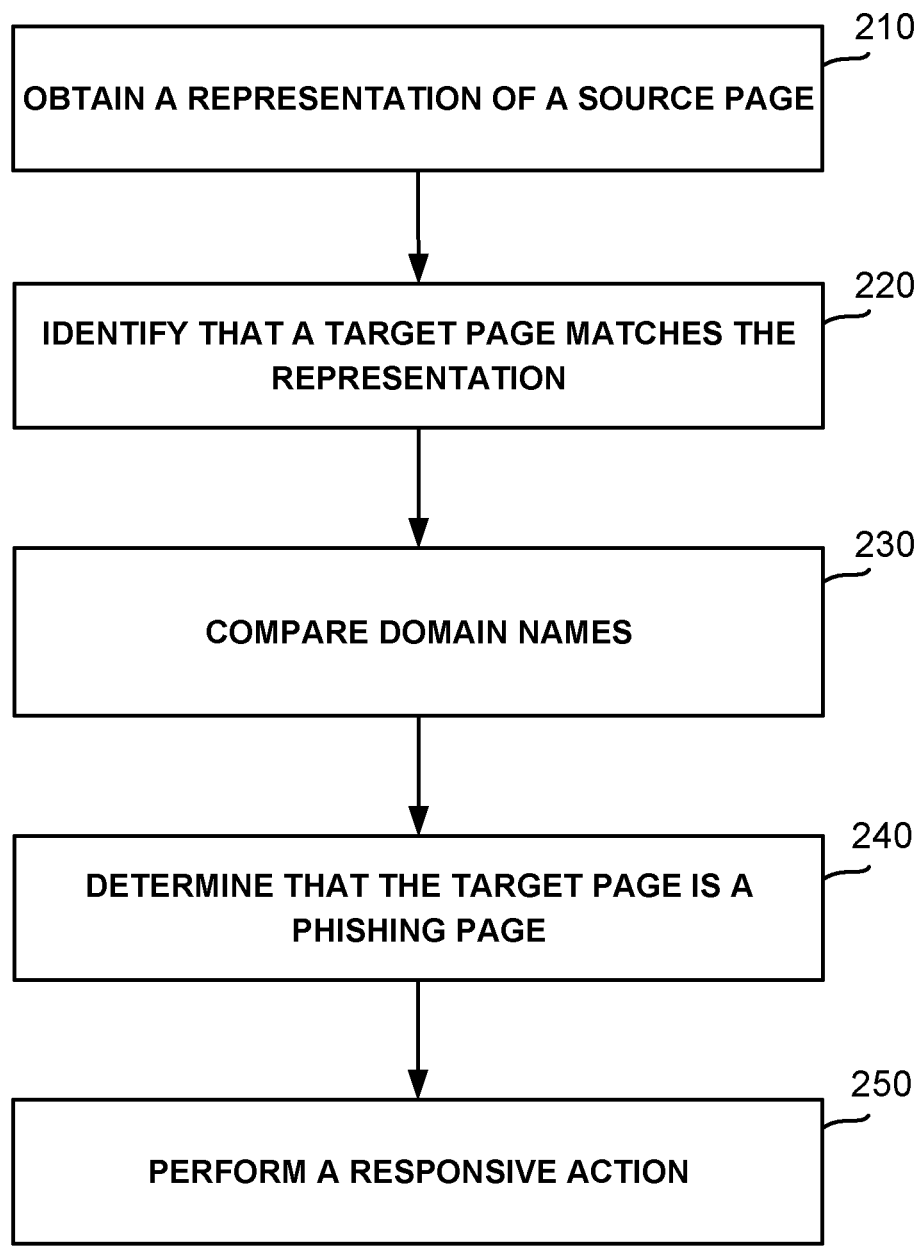
FIG. 2 shows a flowchart diagram of a method, in accordance with some exemplary embodiments of the disclosed subject matter.

Referring now to FIG. 2, showing a flowchart diagram of a method, in accordance with some embodiments of the disclosed subject matter.

On Step 210, a representation of a legitimate source page, such as a representation determined on Step 120 of FIG. 1, may be obtained. In some exemplary embodiments, the representation may comprise, for each selected element thereof, one or more respective representations of the element. In some exemplary embodiments, the representation of the source page may comprise a representation that can be applied to or executed on any rendered website, web application, or the like.

On Step 220, a rendered target page that matches the representation of the source page may be identified, obtained, or the like, such as at a client device. In some exemplary embodiments, the target page may be different than the matching source page, such as by having one or more different properties, attributes, or the like. For example, a client device that is operated by a user may obtain a target page, and enable the user to interact with the target page. Upon rendering the target page, comparisons may be performed between the target page and various source pages of the legitimate database. In some exemplary embodiments, a source page that corresponds to the target page may be identified in any other way, e.g., based on a domain name of the target page, a user input regarding an estimated identity of the target page, a link to the target page, or the like.

In some exemplary embodiments, a visual similarity measurement between the legitimate source page and the rendered target page may be determined. In some exemplary embodiments, the visual similarity measurement may be based on a successful or unsuccessful acquisition of one or more page elements in the rendered page, such as using respective representations of the page elements. In some cases, the visual similarity measurement may be based on acquisition of the selection of page elements (e.g., obtained at Step 110 of FIG. 1), or based on an acquisition of a portion the selection of page elements. In some cases, a page element may have multiple alternative representations, and the page element may be acquired over a page by independently using some or all of the alternative representations to acquire the page element in the page, without relying on a single representation to acquire the page element, In some exemplary embodiments, a rendered page may be determined to match the legitimate page based on a successful acquisition of one or more page elements in the rendered page. An acquisition may be considered successful in case only one element is found in the rendered page for a representation of a page element, in case a confidence score of the acquisition complies with a threshold, in case a number of acquired elements in the rendered page complies with a threshold, or the like. In case the respective representations of the recorded elements correspond to rendered elements of the rendered page, the rendered page may be determined to match the legitimate page. In some exemplary embodiments, a rendered page may be determined to match the legitimate page based on a comparison between the representations of the recorded elements and extracted attributes of the rendered page. In some exemplary embodiments, a rendered page may be determined to match the legitimate page based on an execution of queries of the representation over the rendered page, and identifying query results in the rendered page.

In some cases, page elements may be acquired by applying queries that search for the page elements in the rendered page. In some exemplary embodiments, the page elements of the legitimate page may be determined to correspond to the rendered elements in the rendered page, in case executing the queries over the rendered page and over the legitimate page obtain at least some same elements. In some exemplary embodiments, in case that multiple queries that are associated to a single page element of a legitimate page obtain a single result in the rendered page, this may strongly indicate that the elements correspond, match, or the like, such as with a high confidence score. The confidence score may depend on the percentage of queries or other representations of a page element that result with a single page element in the rendered page. In some exemplary embodiments, the executed queries may represent a subset of selected elements from each legitimate page, as selected by an operator, a user, an automation process, or the like.

In some exemplary embodiments, the visual similarity measurement may be determined subject to a rendered page comprising one or more sensitivity indications, such as a user input field. In some exemplary embodiments, the rendered page may be analyzed and compared to representations of legitimate pages, in case the rendered page has one or more sensitive or vulnerable attributes. In some exemplary embodiments, the rendered page may be considered vulnerable to phishing attacks in case it includes user input fields, e.g., a user name input field, a password input field, an account number input field, a credit card number input field, a telephone number input field, an e-mail address input field, or the like. In some exemplary embodiments, the rendered page may be considered vulnerable based on a semantic analysis of its content, based on classifiers that are trained on a dataset of sensitive and non-sensitive pages, or the like. In some exemplary embodiments, a rendered page may be analyzed to identify login pages, comprising fields into which the user is encouraged to enter a user name, a password, an account number, a telephone number, an e-mail address, or the like, password reset pages, pages with credentials, pages with credit card fields, or the like. In some exemplary embodiments, a rendered page may be analyzed in case it includes a recurring template of a login process, a reset password process, a single sign-on (SSO) process, an MFA process, a process associated with an Identity Provider (IdP) service, or any other process that is configured to obtain sensitive user input. In some cases, multiple organizations may utilize a same platform for the sensitive process, which may result with the organizations having websites with a similar design, template, or the like. For example, a platform for sensitive processes may include a similar user name textbox, password textbox, a logo of the platform, an MFA, or the like, which may be used to identify sensitive pages. In some exemplary embodiments, a classifier may be trained to identify attributes of such pages, and a visual similarity measurement may be performed for them. Alternatively, a visual similarity measurement may be performed any rendered page.

In some exemplary embodiments, in order to identify, for a rendered page, an analogous legitimate website in the legitimate database, one or more representations, queries, or the like, may be processed or applied with respect to the rendered page. In some exemplary embodiments, representations of elements legitimate pages may be matched to rendered elements of the rendered page, until a match is or is not detected, where a match indicates that an element is acquired on both pages. In some exemplary embodiments, the representations of the page elements may be determined to correspond to the rendered elements of the rendered page in case a similarity measurement between the respective representations and the rendered elements complies with a similarity threshold, in case the representations of the legitimate page represent the rendered elements of the rendered page, or the like. In some exemplary embodiments, a similarity measurement between pages may be computed based on a rate of page elements that are acquired in both pages, a confidence thereof, or the like. In some exemplary embodiments, a similarity measurement between pages may be computed based on accumulated information regarding an appearance of a rendered page, and one or more rules (manually created, automatically created, or the like) configured to process the information such as rules automatically detecting anomalies from the legitimate page.

In some exemplary embodiments, a visual similarity measurement or score between pages may be computed by extracting page data from the rendered page, e.g., using a browser extension, a browser plug-in, a screen monitor, a computer vision algorithm, or the like. For example, DOM data may be extracted from the rendered page and compared to contextual or DOM-based representations of page elements in the legitimate database. In some exemplary embodiments, a visual similarity measurement between pages may be computed by executing element representations over the rendered page, such as in order to detect representations of page elements of the legitimate page in the rendered page.

In some exemplary embodiments, in order to acquire a page element over the rendered page, it may not be necessary that multiple alternative representations of the page element will identify a single page element in the rendered page, or that all of the page elements selected for the legitimate page will be identified in the rendered page, e.g., since small changes may occur between different versions, languages, or the like, of a same legitimate page. In some exemplary embodiments, the visual similarity measurement between pages may be determined based on partial matching of elements of the legitimate page to the elements of the rendered page, based on partial matching of alternative representations of a page element of the legitimate page to an element of the rendered page, or the like. For example, a first element may be successfully acquired in a rendered page, while a second element may fail to be acquired in the rendered page. According to this example, although the second element was not acquired, the visual similarity measurement may, in some cases, be determined to be greater than a threshold indicative of a phishing attack.

In some exemplary embodiments, in case a legitimate page is provided in a first language, and the rendered page is provided in a second language, the visual similarity measurement between the pages may be determined and compared to a threshold. In some cases, the visual similarity measurement may be determined to be greater than or above the threshold in spite of the different languages used by the legitimate page and the rendered page, such as in case one or more page elements of the legitimate page are acquired in the rendered page. In some exemplary embodiments, at least one representation of a page element may be useful for acquiring the page element in the legitimate page and for acquiring a translated page element in the rendered page. In some cases, the page element may comprise text in the first language, while the translated page element may comprise a translation of the text in the second language. In some exemplary embodiments, classifying the rendered page as a phishing attack may be performed based on the visual similarity measurement being above a threshold.

In some exemplary embodiments, a visual similarity measurement between page sequences may be determined. In some exemplary embodiments, a legitimate sequence of pages may comprise two or more legitimate pages, including at least a legitimate page and a subsequent legitimate page, in which a user is required to provide information. For example, a legitimate sequence of pages may include a two-stage login. In some exemplary embodiments, a rendered page and a subsequent rendered page, that is navigated to by the client device from the rendered page, may be obtained. In some exemplary embodiments, a first similarity measurement may be measured between the legitimate page and the rendered page, and a second similarity measurement may be measured between the subsequent rendered page and the subsequent legitimate page, and so on. In some exemplary embodiments, classifying the rendered page, or the sequence of rendered pages, as a phishing attack, may be based on the first and/or second similarity measurements.

In some exemplary embodiments, in case each of the rendered page and the subsequent rendered page appear as legitimate pages independently, e.g., having a similarity measurement below a threshold with respect to the legitimate sequence, the first similarity measurement may be lesser than a threshold indicative of a phishing attack, and the second similarity measurement may be lesser than or below the threshold indicative of a phishing attack. However, in some cases, although the first and second similarity measurements are lesser than the threshold, a combination of the rendered page and the subsequent rendered page may be classified, together, as the phishing attack, such as based on a combined score. In some exemplary embodiments, the similarity measurements may be determined by determining an average similarity score of a legitimate page sequence and a corresponding rendered sequence of pages, and comparing the average score to a sequence similarity threshold, which may or may not be a lower threshold than the individual threshold of each page pair. In some cases, the rendered page and the subsequent rendered page may be determined to correspond to the legitimate page and to a subsequent legitimate page, in case an average similarity score of the rendered page and of the subsequent rendered page complies with a sequence similarity threshold, that is lesser than the individual similarity thresholds of each page.

In some cases, any number of subsequent legitimate pages may be used.

In some exemplary embodiments, the similarity measurements may measure a functionality of the page sequences, such as a navigation of relationship thereof. In some exemplary embodiments, in case a rendered page is not matched (e.g., with a high enough score or confidence) to a legitimate page, and the legitimate page is part of a page sequence, the user screen may be monitored to identify a navigation to a next page. Upon the user navigating to a subsequent rendered page, a navigation similarity measurement between the subsequent rendered page and the subsequent legitimate page may be performed, to compare the navigation methods in both sequences. A phishing attack may be determined in case the navigation similarity measurement shows that the navigations of the sequences are different from each other (e.g., less that a navigation similarity threshold).

In some exemplary embodiments, a detected match of pages may indicate that the pages resemble each other, may seem identical to a user, or the like. In some exemplary embodiments, a similarity measurement may indicate a match in case it complies with a similarity threshold, in case there are at least a predetermined number of acquired elements in the rendered page that are also acquired in a legitimate page, or the like.

On Step 230, a domain name of the legitimate source page may be compared to a domain name of the rendered target page. In some exemplary embodiments, the rendered page may be classified as a phishing attack or as a legitimate page, based on a similarity measurement of a domain name of the rendered page to a domain name of the page being above a first threshold and below a second threshold. In case the similarity measurement of the domain names is lesser than first threshold, this may indicate that the domains are different enough to allow users to easily notice the phishing attack. The second threshold may indicate that the domain names are identical, indicating that the rendered page is an instance of the legitimate page. In some exemplary embodiments, based on a domain name mismatch between the first and second thresholds, the rendered page may be identified as not being a legitimate page.

On Step 240, the rendered target page may be determined or classified to be a phishing page of a phishing attack, e.g., based on the visual similarity measurement, based on the domain name mismatch, based on a certificate analysis, or the like, whereby detecting a phishing attack. In some cases, as the similarity score is higher, the domain name mismatch may indicate with higher confidence that the rendered page is a phishing attack. In some cases, as the domain name mismatch is closer to the second threshold, this may indicate with higher confidence that the rendered page is a phishing attack attempting to imitate a legitimate page.

In some exemplary embodiments, the rendered page may be classified as a phishing page based on a determined domain name mismatch, based on an unsuccessful acquisition of one or more page elements in the rendered page (e.g., for a number of elements that overpasses a threshold), a combination thereof, or the like. In some exemplary embodiments, in response to determining that the representations of the page elements are acquired in the rendered page, but the domain names do not match, the rendered page may be determined to be a phishing page. In some exemplary embodiments, the rendered page may be classified as a phishing page based on an analysis of a certificate of a domain name of the target page. For example, the analysis of the certificate may determine whether the certificate matches the domain name of the source page, whether the certificate is issued by a trusted certification authority, whether the certificate matches a predefined list of certificates, or the like.

On Step 250, one or more responsive actions may be performed in response to detecting the phishing attack, to classifying the target page as a phishing page, or the like. In some exemplary embodiments, the responsive actions may comprise displaying a warning to a user browsing the rendered page, blocking the user from using the rendered page, preventing the user from interacting with an input field of the rendered page, redirecting from the rendered page, issuing an alert to a manager of the legitimate page, or the like. For example, the rendered page may be blocked by terminating the browsing session, terminating a browser tab, inserting transparent objects that block the functionality of the page, or the like.

Figure 3A:
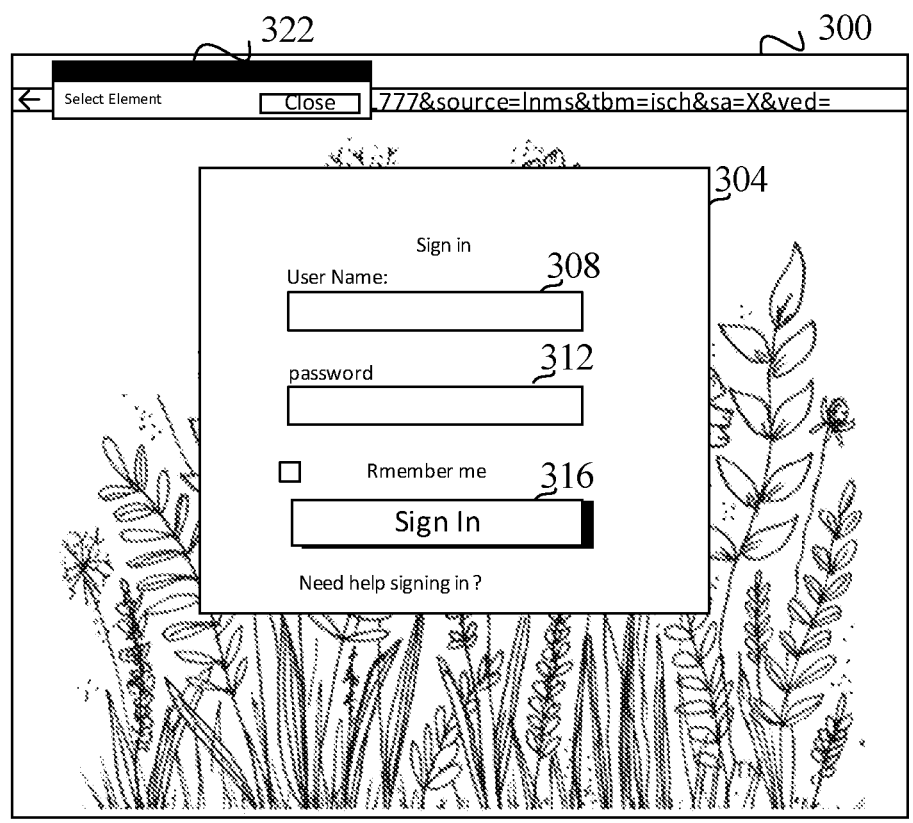
FIGS. 3A-3D illustrate an exemplary scenario, in accordance with some exemplary embodiments of the disclosed subject matter.

Referring now to FIG. 3A, illustrating an exemplary legitimate page, in accordance with some embodiments of the disclosed subject matter. As depicted in FIG. 3A, an exemplary legitimate Page 300 may be loaded, such as in a recording platform. In some exemplary embodiments, Page 300 may comprise a legitimate page of an application, website, or the like, belonging to an owner that wishes to protect her application or website against phishing attacks. In some exemplary embodiments, Page 300 may comprise one or more elements or Graphical User Interface (GUI) controls such as a Sign In Container 304 including a User Name Textbox 308, a Password Textbox 312, a Sign In Button 316, or the like. In some exemplary embodiments, Page 300 may comprise pattern elements such as logos, background images, or the like. In some exemplary embodiments, Page 300 may comprise a domain address, such as in a form of a URL address.

In some exemplary embodiments, recording logic, such as a DAP editor, a computer vision agent, or the like, may be executed over Page 300. In some exemplary embodiments, the recording logic may generate one or more user interface layouts, GUI elements, software layers, or the like, as an overlay over Page 300. For example, the agent may generate a Window 322 indicating to the user that Page 300 is in a recording stage, that element of Page 300 can be selected, that a certain element is recommended to be selected, or the like.

Figure 3B:
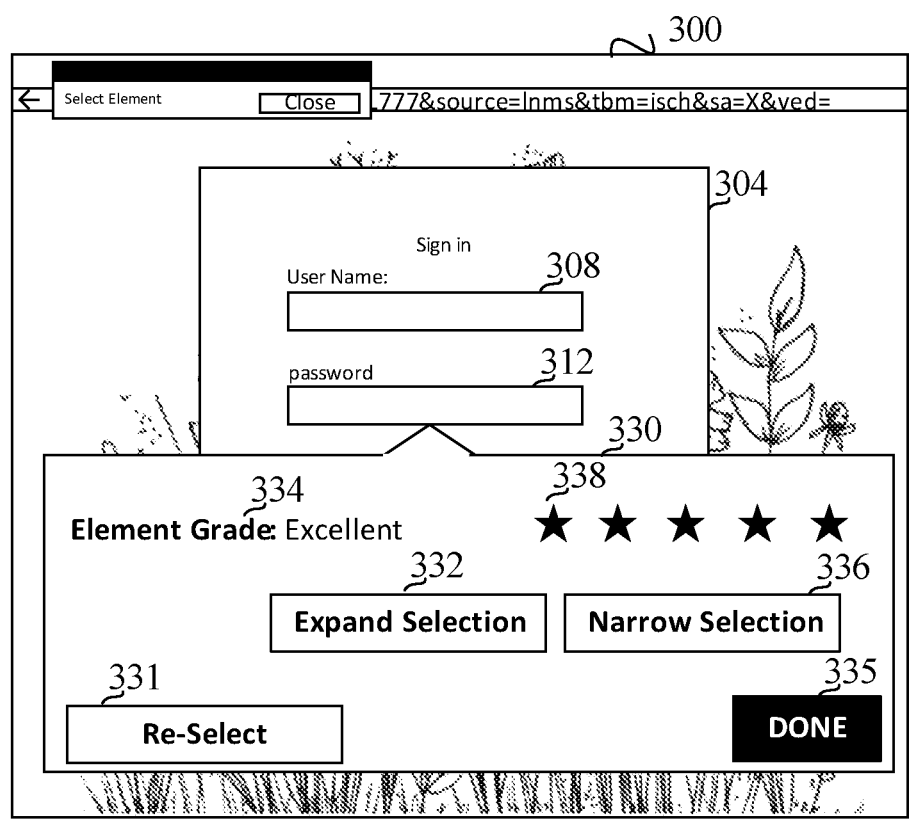

Referring now to FIG. 3B, illustrating an exemplary element selection scenario, in accordance with some embodiments of the disclosed subject matter.

In some exemplary embodiments, one or more elements of Page 300 may be selected in the recording platform. In some exemplary embodiments, in response to identifying that Page 300 is in a recording state, a human user such as an operator may select one or more elements of Page 300 that are estimated to uniquely represent Page 300. In some exemplary embodiments, an automation process such as a Cascading Style Sheets (CSS) selector, a data-driven classifier, or the like, may select the elements. In some exemplary embodiments, the elements may be selected to include distinguishing elements, unique elements, identifying attributes, elements that comply with one or more conditions, or the like.

In some exemplary embodiments, the recording logic may automatically scrape and extract attributes of the one or more selected elements from Page 300, and generate one or more representations for each selected element. In some exemplary embodiments, representations for each selected element may be generated based on properties of the selected element, DOM representations thereof, a domain name of Page 300, invisible or visible attributes of the element, or the like. In some exemplary embodiments, representations for an element may be generated to acquire a selected element using DOM-based representations, contextual representations, representations of visual attributes, representations of invisible attributes, or the like.

For example, the user may select a Password Textbox 312 field for the page's representation. In some exemplary embodiments, the recording logic may generate one or more representations for Password Textbox 312, e.g., DOM-based representations, contextual representations, query-type representations, non-executable representations, or the like. In some exemplary embodiments, recording logic may determine a Quality Detection 330 of Password Textbox 312, e.g., based on a robustness level of the representations of each element. In some exemplary embodiments, Quality Detection 330 may be presented via a pop-up window, a notification, a content frame, a presentation element, an inline frame (iframe), or the like. In some exemplary embodiments, Quality Detection 330 may include one or more fields, rates, elements, or the like, such as an Accuracy Rating 338, an Element Grade 334, or the like, which may indicate the robustness level of the representations, a uniqueness level of the selected element, or the like. In some exemplary embodiments, in case Accuracy Rating 338 or Element Grade 334 are low, or in case the user desires to adjust a robustness level of the representations, Quality Detection 330 may suggest or enable to increase a perimeter of a selected element, decrease the perimeter, change a selection, or the like. For example, the controls may include an Expand Selection 332 button, a Narrow Selection 336 button, a Re-select 331 button, or the like, which may be submitted with a Done 335 button. In some exemplary embodiments, Expand Selection 332 may enable to expand the selection of the element to a larger area, while Narrow Selection 336 may enable to narrow the selected area, and Re-select 331 button may enable the user to change the selected element. One or more representations may be generated and retained in a for a final selected area. In some exemplary embodiments, a robustness level of a selected element may be determined based on a size of the element, a uniqueness of the element in the page, a classifier with historic data, a database with multiple elements and page, or the like.

In some scenarios, the generated representations of Password Textbox 312 may be stored in a legitimate database, and may be embedded into a software platform such as a DAP that can be executed over Page 300, an application player, a browser extension, a browser plugin, or the like. For example, a software platform may apply representations to rendered pages, such as by extracting content from the rendered pages and comparing the content to the stored representations of the legitimate database, executing queries defining the representations over rendered pages, or the like.

Figure 3C:
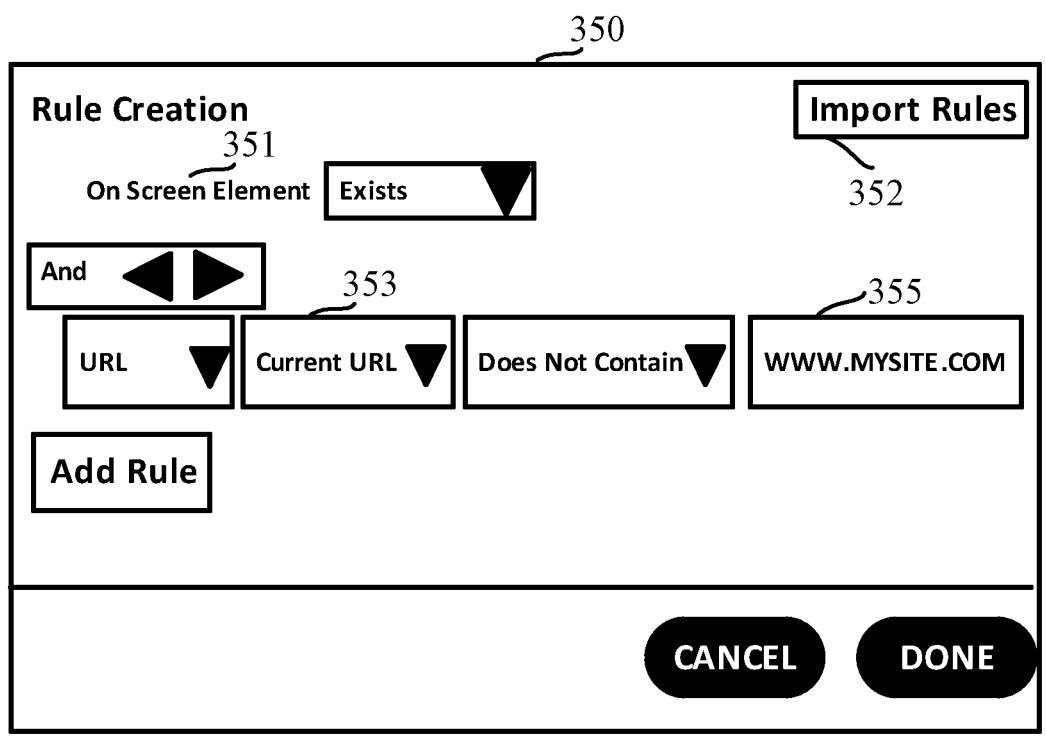

Referring now to FIG. 3C, illustrating an exemplary rule generation, in accordance with some embodiments of the disclosed subject matter.

In some exemplary embodiments, a representation of an element may comprise one or more rules identifying the element, which may be used to represent and acquire the element. The rules may be generated by a condition builder, or in any other way. The rules may identify whether one or more DOM elements are present in a rendered page, whether one or more attributes of an element are present in a rendered page, or the like. In some exemplary embodiments, a rule such as Rule 350 may include one or more conditions, with one or more logical operators defining a relation between respective conditions. In some exemplary embodiments, the conditions may define an existence of the selected elements in the DOM of currently rendered pages, such as one or more Display 351 conditions defining one or more onscreen elements, one or more offscreen elements, or the like. In addition to Display 351 conditions, Rule 350 may be generated to include a URL condition, being associated with a logical conjunction operator. In some exemplary embodiments, Rule 350 may include a domain condition that requires a domain name of a Current Domain 353 of a rendered page to be different from a domain name of a Recorded Domain 355 of a corresponding legitimate page.

In case of a logical conjunction operator ('and', &&, or the like) associating both conditions, Rule 350 may be complied with in case the one or more elements indicated by the Display 351 condition are detected in a rendered page, and the URL of the rendered page does not match to the URL of the legitimate page, indicating that the rendered page is a phishing page. In some exemplary embodiments, after completing the definition of Rule 350, the rule may be created, such as by selecting a 'done' button, which may cause the Rule 350 to be retained and applied by the agent. In some exemplary embodiments, in case a desired rule already exists for a page that is being protected against phishing attacks, the rule may be imported, such as by selecting Import Rules 352 button.

In some exemplary embodiments, generated rules may comprise contextual rules identifying contextual properties of rendered page. In some exemplary embodiments, one or more representation of an element may comprise executable representations that may be executed over rendered pages, and the rules may define that in case all or some queries of a recorded element such as Password Textbox 312 identify a single element in a rendered page, and the domain names mismatch, the rendered page is a phishing page. In some exemplary embodiments, appliance settings may be generated or determined to define rendered pages over which the rules should be applied. For example, appliance settings may define that the rules should be applied over login pages, password resetting pages, or the like.

In some exemplary embodiments, instead of generating rules, rules may be defined implicitly by the recording logic, may be set as a default setting, may be predefined, or the like. For example, any selection of an element for recording may cause representations of the element to be generated automatically, and rules configured to identify the representations in different pages may be generated automatically. In case a match is found between pages with a similarity score that exceeds a similarity threshold, the domain names may be automatically examined to identify a mismatch using a predefined rules, without defining explicitly any rules regarding the representations or the domain names. In some exemplary embodiments, any generated rules and representations may be stored in a legitimate database.

Figure 3D:
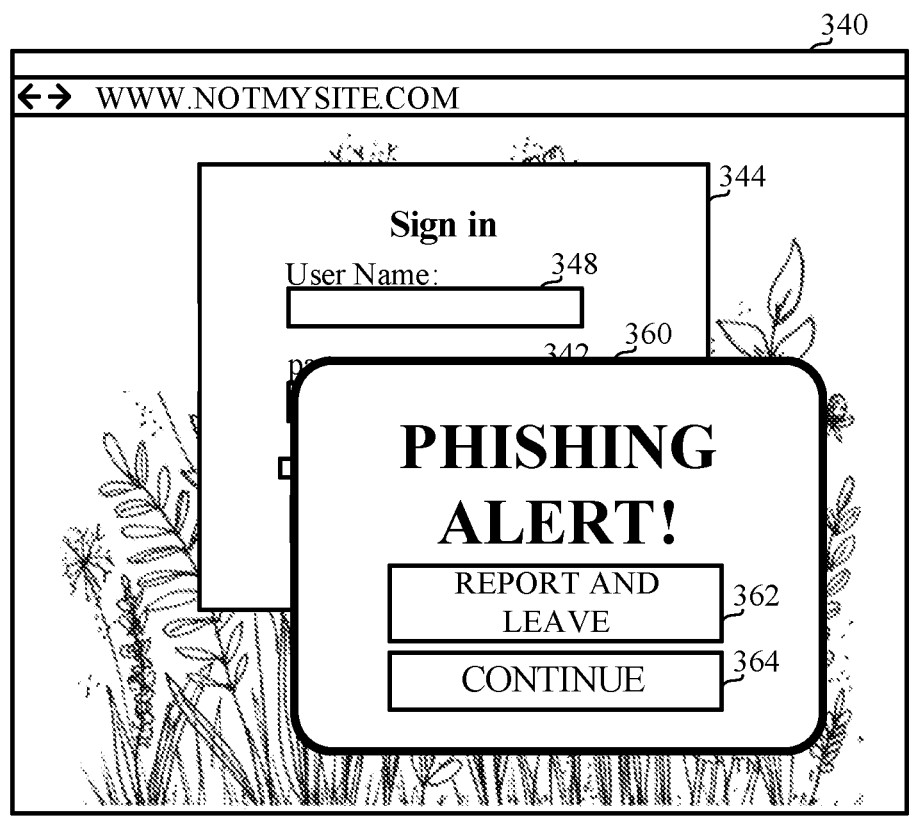

Referring now to FIG. 3D, illustrating an exemplary phishing attack, in accordance with some embodiments of the disclosed subject matter. In some exemplary embodiments, a page such as Page 340 may be rendered by a browser, an application, or the like. In some exemplary embodiments, Page 340 may comprise fields or elements such as a Sign In Container 344 including a User Name Textbox 348, a Password Textbox 342, or the like. In some exemplary embodiments, Page 340 may be examined to determine whether it is vulnerable for phishing attacks, e.g., whether user input is configured to be provided via the page, whether the page depicts a login process, whether the page depicts a password resetting process, or the like.

Upon detecting that Page 340 is vulnerable to phishing attacks, one or more rules, representations, or the like, of legitimate pages from the legitimate database may be applied over Page 340, compared to an extraction of Page 340, or the like, such as in order to determine whether or not Page 340 is a phishing page that imitates features, properties, elements, representations, or the like, of a legitimate page. In some exemplary embodiments, representations of selected elements, such as queries detecting elements, may be applied to Page 340, executed over Page 340, or the like. In some exemplary embodiments, a represented element of Page 300 may be identified in Page 340 in case all of some of the representations of the element result with a single element in Page 340. For example, in case Password Textbox 312 of Page 300 is selected to be recorded and is represented by properties indicating that Password Textbox 312 is a textbox, includes a string 'password' above the textbox, and is placed below a second textbox, e.g., User Name Textbox 308, above which the string 'user name' is placed, a corresponding element in Page 340 may be acquired, identified, or the like, by searching for the properties of Page 300 in Page 340, such as be querying the DOM of Page 340, and identifying that Password Textbox 342 corresponds to Password Textbox 312. In some exemplary embodiments, in case multiple elements of Page 300 are identified in Page 340, a defined percentage of the represented elements are identified in Page 340, or the like, Page 340 may be determined to correspond or match Page 300, e.g., based on a similarity score of the identified elements complying with a threshold, a number of corresponding elements complying with a threshold, or the like.

In some exemplary embodiments, in case a similarity score of multiple elements of Page 300 that identified in Page 340 are, in average, above a similarity threshold, are each above a minimal similarity requirement, or the like, and all or some of the selected elements of Page 300 are identified in Page 340, Page 340 may be determined to correspond or match Page 300.

In some cases, properties of Page 340 may be extracted and compared to recorded or stored representations of selected elements in a legitimate page such as Page 300. In some cases, instead of applying or executing representations over Page 340, properties of Page 340 may be extracted. For example, a DOM representation of Page 340 may be extracted, and textboxes therein may be compared to indicated textboxes that are represented in Page 300. Page 340 may be determined to match or correspond to Page 300 in case it resembles the representations of Page 300 in a sufficient manner, e.g., above a similarity threshold. In case defined elements and their properties, as defined with respect to Page 300, are fully or partially identified in the extracted data of Page 340, the pages may be determined to match.

In some cases, Page 340 may be determined to correspond or match Page 300 although one or more differences between the pages may be identified, causing one or more representations of Password Textbox 312 not to be found in Page 340. For example, Password Textbox 312 of Page 300 may be represented by contextual properties indicating that Password Textbox 312 is a textbox element, includes a string 'password' above the textbox, and is placed below a second textbox, e.g., User Name Textbox 308, above which the string 'user name' is placed. In case Password Textbox 342 of Page 340 is placed above User Name Textbox 348 (not illustrated), the representations of Password Textbox 312 defining that Password Textbox 312 is a textbox element, and Password Textbox 312 includes a string 'password' above the textbox, may be identified in Page 340, although other representations of Password Textbox 312 defining that Password Textbox 312 is placed below a second textbox, e.g., User Name Textbox 308, may not be detected. In such cases, the pages may be determined to match, such as based on an adjustable similarity threshold that may not require all the representations to match. For example, a similarity threshold may be define that pages can match even if one or two representations are not found in the rendered page, even if a third of the representations are not found, or the like.

In some exemplary embodiments, in case Page 340 is determined to match to Page 300, or to any other page of the legitimate database, the domain names of the pages may be compared. In case the domain names to not match, such as by having one or more slight differences, Page 340 may be determined to comprise a phishing page that imitates Page 300. For example, in case a URL of Page 340 comprises one different character than the URL of Page 300, the domain names may be determined not to match. In some exemplary embodiments, in order to determine a mismatch of domain names, Page 340 may include an entirely different domain than Page 300 ('notmysite.com'), or a similar domain with slight changes.

In some exemplary embodiments, in response to determining that Page 340 comprises a phishing page, one or more responsive actions may be performed. In some exemplary embodiments, a responsive action may comprise generating one or more alerts, notifications, warnings, or the like, such as an Alert 360, including a popup window, a warning, an alert, a banner, or the like. For example, Alert 360 may include a banner displayed at the top of Page 340 that warns the user from taking further action, from browsing its content, from providing sensitive data through the user interface of Page 340, from using services of Page 340, or the like. In some cases, Alert 360 may warn the user that Page 340 is estimated to be a phishing page, recommend the user to close the page immediately, or the like. In some cases, Alert 360 may comprise one or more fields, controls, or the like, enabling the user to select to ignore Alert 360, to terminate the session, or the like. For example, Alert 360 may comprise a Report and Leave 362 button, a Continue 364 button, or the like. The Report and Leave 362 button may enable the user to report Page 340 as being a phishing page, such as to relevant authorities, and to leave Page 340, while Continue 364 may enable to user to continue to browse Page 340. In some exemplary embodiments, the agent may present a protective measure to prevent the user from falling victim to a phishing attack. In some exemplary embodiments, the agent may perform one or more responsive action, instead of or in addition to presenting Alert 360. For example, the agent may block interactions with the page, terminate the browser session, or the like.

Figure 4:
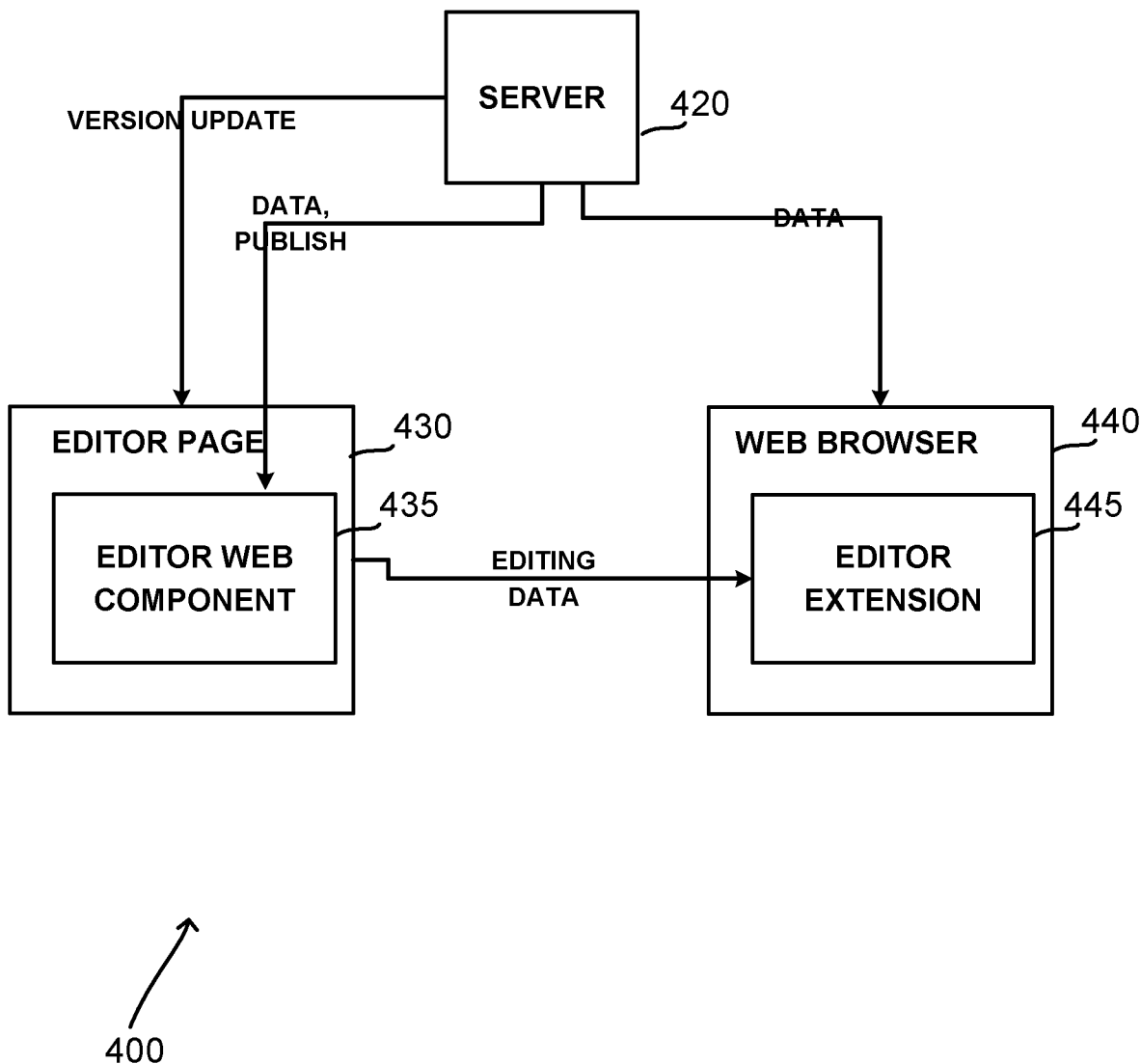
FIG. 4 shows a schematic illustration of an exemplary environment and architecture in which the disclosed subject matter may be utilized, in accordance with some exemplary embodiments of the disclosed subject matter.

Referring now to FIG. 4, showing a schematic illustration of an exemplary environment and architecture in which the disclosed subject matter may be utilized, in accordance with some exemplary embodiments of the disclosed subject matter.

In some exemplary embodiments, Environment 400 may comprise an Editor Page 430, which may comprise a page of an editor application, editor website, or the like. For example, Editor Page 430 may comprise a page of an Electron web application running in a browser engine, a native application, or the like. In some exemplary embodiments, Editor Page 430 may enable an operator to record elements of a legitimate page, such as via an Editor Web Component 435. In some exemplary embodiments, Editor Web Component 435 may generate one or more representations for each element of Editor Page 430 that is selected by the operator.

In some exemplary embodiments, Environment 400 may comprise a Web Browser 440, which may comprise one or more plugins, extensions, or the like, such as an Editor Extension 445. In some exemplary embodiments, Editor Extension 445 may access and monitor one or more pages that are rendered by Web Browser 440, such as via hooks, DOM extractions, scraping data, monitoring screens, or the like. In some exemplary embodiments, Editor Extension 445 may obtain editing data from Editor Page 430, such as data indicating representations of legitimate pages, and apply the representations to pages that are rendered by Web Browser 440. For example, Editor Extension 445 may extract data from a display of a rendered page, and compare the data to the representations of legitimate pages. In some exemplary embodiments, in case a rendered page matches representations of a legitimate page, and the domain names of the pages are not identical, a phishing attack may be determined.

In some exemplary embodiments, Environment 400 may comprise a Server 420, such as a remote server, a publishing server, a cloud server, or the like. In some exemplary embodiments, Server 420 may manage the editing application or website, including Editor Page 430, such as by supplying version updates to the editing application, supplying data to Editor Page 430, or the like. In some exemplary embodiments, Server may manage Editor Extension 445, such as by providing data to Editor Extension 445, directly or via Web Browser 440. In some exemplary embodiments, Server 420 may synchronize data between the editing components, manage maintenance operations, retain a legitimate database, or the like. In some exemplary embodiments, in case of detected phishing pages, or in case a rendered page is determined not to be a phishing page, Editor Extension 445 may inform or update Server 420 of the examined page, attributes thereof, a matched legitimate page, and the result of the analysis.

Figure 5:
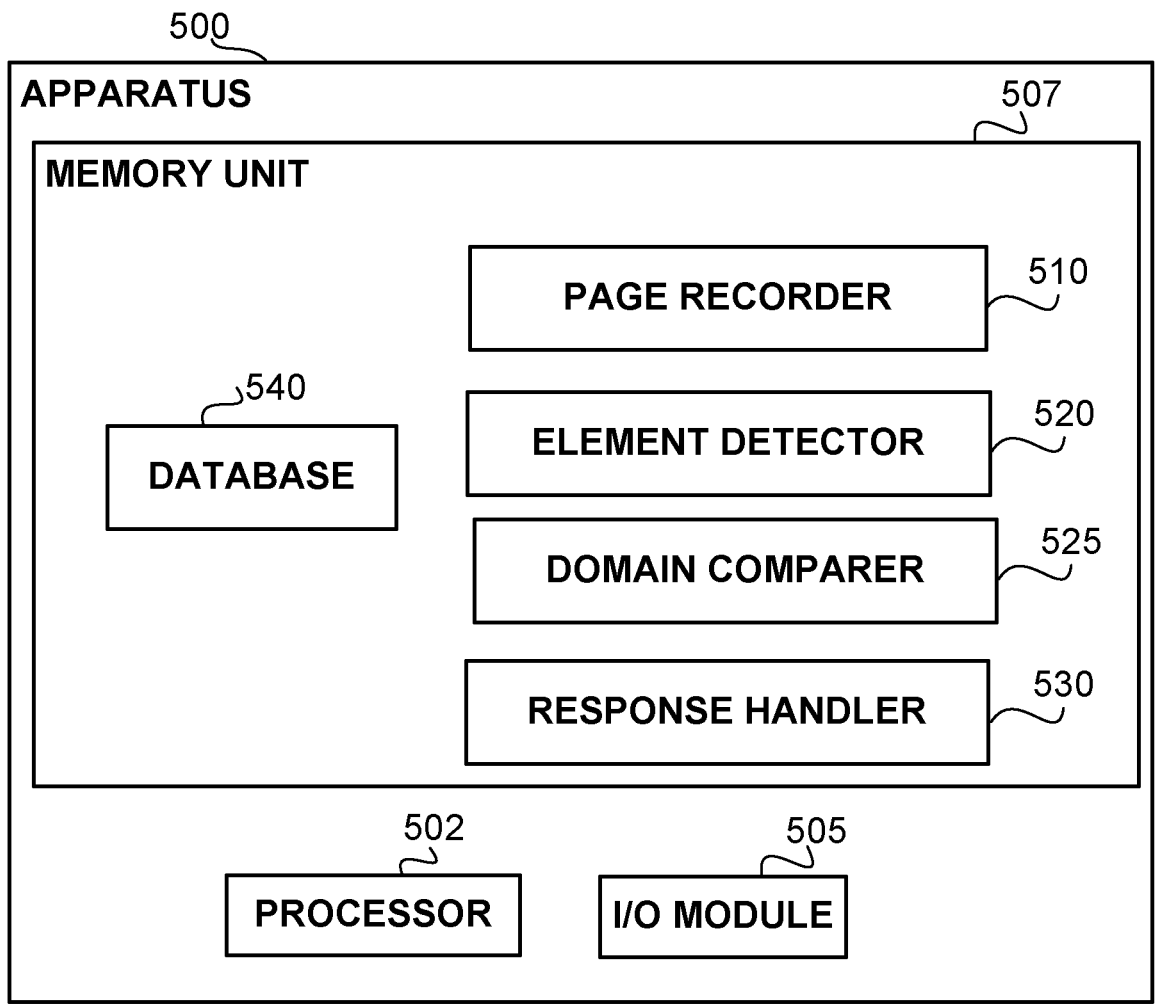
FIG. 5 shows a block diagram of an apparatus, in accordance with some exemplary embodiments of the disclosed subject matter

Referring now to FIG. 5 showing a block diagram of an apparatus, in accordance with some exemplary embodiments of the disclosed subject matter.

In some exemplary embodiments, an Apparatus 500 may comprise a Processor 502. Processor 502 may be a Central Processing Unit (CPU), a microprocessor, an electronic circuit, an Integrated Circuit (IC) or the like. Processor 502 may be utilized to perform computations required by Apparatus 500 or any of its subcomponents. Processor 502 may be configured to execute computer-programs useful in performing the methods of FIGS. 1-2, or the like.

In some exemplary embodiments of the disclosed subject matter, an Input/Output (I/O) Module 505 may be utilized to provide an output to and receive input (e.g., element selections) from a user such as an operator, an automation program, or the like. I/O Module 505 may be used to transmit and receive information to and from the user or any other apparatus, e.g., a server, in communication therewith.

In some exemplary embodiments, Apparatus 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 502 to perform acts associated with any of the subcomponents of Apparatus 500. In some exemplary embodiments, Memory Unit 507 may retain program code operative to cause Processor 502 to perform acts associated with any of the steps in FIGS. 1-2, or the like.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

In some exemplary embodiments, Page Recorder 510 may be configured to provide a user with a user interface that enables to select elements from a loaded page. In some exemplary embodiments, Page Recorder 510 may be configured to generate, for each selected element, one or more rules, representations, or the like, that enable to identify or acquire the recorded elements over different pages. In some exemplary embodiments, Page Recorder 510 may be configured to store recorded elements in a database such as Database 540, e.g., in association with the recorded page, with a domain name of an associated website including the recorded page, or the like.

In some exemplary embodiments, Element Detector 520 may be configured to be executed over a rendered page, such as by a browser extension, a browser plugin, an iframe, of the like. In some exemplary embodiments, Element Detector 520 may be configured to apply representations associated with pages recorded by Page Recorder 510, pages retained in Database 540, or the like, over a rendered page. In some exemplary embodiments, Element Detector 520 may detect, for each representation of a selected element of a stored page, whether or not the representation of the element matches the rendered page. In some exemplary embodiments, Element Detector 520 may determine that a recorded page matches a rendered page in case at least some elements of the recorded page are identified with at least a minimal confidence score in the rendered page. In some exemplary embodiments, the level of matching may be adjusted manually, such as by a user via I/O Module 505, automatically, or the like.

In some exemplary embodiments, Domain Comparer 525 may be configured to compare a domain name of a rendered page with a domain name of a matching recorded page, e.g., as determined by Element Detector 520. In some exemplary embodiments, Domain Comparer 525 may consider the domain names to mismatch in case one or more characters of the domain names are different, are placed in a different order, or the like. In some exemplary embodiments, in case a domain mismatch is determined, Domain Comparer 525 may determine that the rendered page is a phishing page.

In some exemplary embodiments, Response Handler 530 may obtain from Domain Comparer 525 an indication that a rendered page is a phishing page, and perform one or more responsive actions such as alerting the user, blocking the user interactions with the rendered page, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
obtaining a selection of one or more page elements from a plurality of page elements of a legitimate page, wherein the one or more page elements are selected from the plurality of page elements as they are estimated to represent a visual appearance of the legitimate page better than other page elements of the legitimate page;
generating one or more respective representations of the one or more page elements, wherein a representation of the one or more respective representations represents a selected page element of the one or more page elements, wherein the representation is configured to be used for acquiring the selected page element in different pages;
obtaining, at a client device, a target page, wherein the client device is operated by a user and enabling the user to interact with the target page;
determining a match between the legitimate page and the target page, the match is determined based on a score of a visual similarity measurement between the legitimate page and the target page being greater than a threshold, wherein the score of the visual similarity measurement is based on an outcome of performing an acquisition in the target page, of the one or more page elements, or portion thereof, using the one or more respective representations;
classifying the target page as a phishing attack based on the match, whereby detecting the phishing attack; and
performing a responsive action in response to said detecting the phishing attack.

2. The method of claim 1, wherein the legitimate page is provided in a first language, wherein the target page is provided in a second language, wherein said determining the match comprises determining that the score of the visual similarity measurement is above the threshold in spite of the different languages used by the legitimate page and the target page.

3. The method of claim 2, wherein the representation of the selected page element is useful for acquiring the selected page element in the legitimate page and for acquiring a translated page element in the target page, wherein the selected page element comprises text in the first language, wherein the translated page element comprises a translation of the text in the second language.

4. The method of claim 1,
wherein the legitimate page is part of a sequence of pages in which the user is required to provide information, wherein the sequence of pages comprise the legitimate page and a subsequent legitimate page;
wherein the method further comprises:
obtaining a subsequent target page, wherein the subsequent target page is navigated to by the client device from the target page;
determining a second match between the subsequent legitimate page and the subsequent target page, the second match is determined based on a score of a second visual similarity measurement between the subsequent target page and the subsequent legitimate page;
wherein said classifying the target page is further based on the score of the second visual similarity measurement.

5. The method of claim 1, wherein the selection is obtained from a human operator via a user interface of an operator device, wherein the user interface enables to expand an area of the selected page element, and to narrow the area of the selected page element.

6. The method of claim 1, wherein the one or more page elements are estimated to represent the visual appearance of the legitimate page, in at least one of the following cases: in case the one or more page elements enable to identify the legitimate page, in case the one or more page elements are highly perceivable in the legitimate page, or in case the one or more page elements are unique in the legitimate page.

7. The method of claim 1, wherein said obtaining the selection comprises:
obtaining multiple selections by human operators of elements, wherein each human operator providing a selection of a respective set of elements; and
automatically determining the one or more page elements based on the multiple selections.

8. The method of claim 1, wherein the representation of the selected page element comprises multiple alternative representations of the selected page element, wherein each alternative representation of the selected page element indicates a respective attribute of the selected page element, wherein each alternative representation is configured to independently enable acquisition of the selected page element, whereby providing a robust acquisition method that does not rely on a single representation.

9. The method of claim 1, wherein said determining the match comprises:
successfully acquiring a first selected page element of the one or more page elements in the target page; and
failing to acquire a second selected page element of the one or more page elements in the target page;
wherein the score of the visual similarity measurement is determined based on a partial matching of elements of the legitimate page to the elements of the target page.

10. The method of claim 1, wherein said classifying the target page is further based on a similarity measurement of a domain name of the target page to a domain name of the legitimate page being above a first threshold and below a second threshold.

11. The method of claim 10, wherein the second threshold is indicative of identical domain names.

12. The method of claim 1, wherein said classifying is performed based on an analysis of a certificate of a domain name of the target page, wherein the analysis determines at least one of: whether the certificate matches a domain name of the legitimate page, whether the certificate is issued by a trusted certification authority, and whether the certificate matches a predefined list of certificates.

13. The method of claim 1, wherein said determining the match is performed subject to the target page comprising a user input field.

14. The method of claim 13, wherein the user input field comprises at least one field selected from a group consisting of: a user name input field, a password input field, an account number input field, a credit card number input field, a telephone number input field and an e-mail address input field.

15. The method of claim 1, wherein the responsive action comprise at least one action selected from a group consisting of:
displaying a warning to the user;
blocking the user from using the target page;
preventing the user from interacting with an input field of the rendered page;
redirecting the user from the target page; or
issuing an alert to an organization to which the user belongs.

16. The method of claim 1, wherein said generating the one or more respective representations comprises generating the representation of the selected page element based on properties of the selected page element, wherein the properties comprise at least a contextual property and a relative property, wherein the contextual property comprises a property of another element in the legitimate page, wherein the relative property comprises a relationship between the selected page element and the another element.

17. An apparatus comprising a processor and coupled memory, said processor being adapted to:
obtain a selection of one or more page elements from a plurality of page elements of a legitimate page, wherein the one or more page elements are selected from the plurality of page elements as they are estimated to represent a visual appearance of the legitimate page better than other page elements of the legitimate page;
generate one or more respective representations of the one or more page elements, wherein a representation of the one or more respective representations represents a selected page element of the one or more page elements, wherein the representation is configured to be used for acquiring the selected page element in different pages;
obtain, at a client device, a target page, wherein the client device is operated by a user and enabling the user to interact with the target page;
determine a match between the legitimate page and the target page, the match is determined based on a score of a visual similarity measurement between the legitimate page and the target page being greater than a threshold, wherein the score of the visual similarity measurement is based on an outcome of performing an acquisition in the target page, of the one or more page elements, or portion thereof, using the one or more respective representations;
classify the target page as a phishing attack based on the match, whereby detecting the phishing attack; and
perform a responsive action in response to said detecting the phishing attack.

18. The apparatus of claim 17, wherein the legitimate page is provided in a first language, wherein the target page is provided in a second language, wherein said determine the match comprises determining that the score of the visual similarity measurement is above the threshold in spite of the different languages used by the legitimate page and the target page.

19. The apparatus of claim 17,
wherein the legitimate page is part of a sequence of pages in which the user is required to provide information, wherein the sequence of pages comprise the legitimate page and a subsequent legitimate page;
wherein the processor is further configured to:
obtain a subsequent target page, wherein the subsequent target page is navigated to by the client device from the target page;
determine a second match between the subsequent legitimate page and the subsequent target page, the second match is determined based on a score of a second visual similarity measurement between the subsequent target page and the subsequent legitimate page;
wherein said classify the target page is further based on the score of the second visual similarity measurement.

20. A computer program product comprising a non-transitory computer readable medium retaining program instructions, which program instructions when read by a processor, cause the processor to:
obtain a selection of one or more page elements from a plurality of page elements of a legitimate page, wherein the one or more page elements are selected from the plurality of page elements as they are estimated to represent a visual appearance of the legitimate page better than other page elements of the legitimate page;
generate one or more respective representations of the one or more page elements, wherein a representation of the one or more respective representations represents a page element of the one or more page elements, wherein the representation is configured to be used for acquiring the selected page element in different pages;
obtain, at a client device, a target page, wherein the client device is operated by a user and enabling the user to interact with the target page;
determine a match between the legitimate page and the target page, the match is determined based on a score of a visual similarity measurement between the legitimate page and the target page being greater than a threshold, wherein the score of the visual similarity measurement is based on an outcome of performing an acquisition in the target page, of the one or more page elements, or portion thereof, using the one or more respective representations;
classify the target page as a phishing attack based on the match, whereby detecting the phishing attack; and
perform a responsive action in response to said detecting the phishing attack.

* * * * *